US012535398B2

(12) United States Patent
Ghazi

(10) Patent No.: US 12,535,398 B2
(45) Date of Patent: Jan. 27, 2026

(54) FLUID MANAGEMENT SYSTEM FOR AN ANALYZER AND/OR SORTER TYPE FLOW TYPE PARTICLE ANALYZER USING A DETACHABLE CONNECTOR

(71) Applicant: Becton, Dickinson and Company, Franklin Lakes, NJ (US)

(72) Inventor: Christopher Ghazi, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 595 days.

(21) Appl. No.: 17/672,288

(22) Filed: Feb. 15, 2022

(65) Prior Publication Data

US 2022/0341838 A1   Oct. 27, 2022

Related U.S. Application Data

(60) Provisional application No. 63/179,024, filed on Apr. 23, 2021.

(51) Int. Cl.
| | |
|---|---|
| *G01N 15/14* | (2024.01) |
| *G01N 15/1404* | (2024.01) |
| *G01N 15/1409* | (2024.01) |

(52) U.S. Cl.
CPC ..... *G01N 15/1425* (2013.01); *G01N 15/1459* (2013.01); *G01N 2015/1406* (2013.01); *G01N 15/1409* (2024.01); *G01N 2015/142* (2013.01)

(58) Field of Classification Search
CPC .......... G01N 15/1425; G01N 15/1409; G01N 2015/1406; G01N 2015/142; G01N 15/149; G01N 15/1404; G01N 15/1459
See application file for complete search history.

(56) References Cited

U.S. PATENT DOCUMENTS

| | | | | |
|---|---|---|---|---|
| 3,881,872 A | * | 5/1975 | Naono | G01N 35/00 134/22.12 |
| 4,333,356 A | * | 6/1982 | Bartels | G01N 1/38 700/282 |
| 4,606,631 A | * | 8/1986 | Anno | G01N 15/1404 356/338 |
| 4,683,212 A | * | 7/1987 | Uffenheimer | G01N 15/1404 356/73 |

(Continued)

FOREIGN PATENT DOCUMENTS

| | | |
|---|---|---|
| KR | 1020030032828 | 4/2003 |
| WO | WO2012058142 A1 | 5/2012 |

(Continued)

*Primary Examiner* — Michael P LaPage
(74) *Attorney, Agent, or Firm* — Nicholas D. Cervenka; Bret E. Field; BOZICEVIC, FIELD & FRANCIS LLP

(57) ABSTRACT

Fluid management systems for flow type particle analyzers are provided. Aspects of the fluid management systems include a flow cell comprising an input and output; a cuvette comprising an input coupled to the output of the flow cell and further comprising an output; a sample input line for fluidically coupling a sample fluid source to the input of the flow cell; and a fluid supply subsystem configured to alternatively fluidically couple: (a) a primary fluid source; or (b) one or more secondary fluid sources, to the input of the flow cell. Also provided are methods of using flow type particle analyzers having the subject fluid management systems.

20 Claims, 9 Drawing Sheets

(56) References Cited

U.S. PATENT DOCUMENTS

| | | | |
|---|---|---|---|
| 5,079,959 A | 1/1992 | Miyake | |
| 5,182,617 A * | 1/1993 | Yoneyama | G01N 21/11 356/336 |
| 5,395,588 A | 3/1995 | North, Jr. et al. | |
| 5,558,838 A * | 9/1996 | Uffenheimer | G01N 35/1079 422/522 |
| 5,691,486 A * | 11/1997 | Behringer | G01N 35/1097 73/863.73 |
| 5,728,351 A * | 3/1998 | Carver, Jr. | G01N 35/1095 422/537 |
| 6,767,188 B2 | 7/2004 | Vrane et al. | |
| 6,793,542 B1 | 9/2004 | Connelly et al. | |
| 6,793,642 B2 | 9/2004 | Connelly et al. | |
| 7,201,875 B2 | 4/2007 | Norton et al. | |
| 7,220,385 B2 | 5/2007 | Blecka et al. | |
| 8,202,733 B1 * | 6/2012 | Javadi | G01N 15/1404 422/50 |
| 8,283,177 B2 | 10/2012 | Ball et al. | |
| 8,528,427 B2 | 9/2013 | Vrane et al. | |
| 9,347,933 B2 | 5/2016 | Harrison et al. | |
| 9,500,577 B2 | 11/2016 | Shibata et al. | |
| 9,551,637 B2 | 1/2017 | Fox et al. | |
| 9,669,403 B2 * | 6/2017 | Muraki | B01L 3/502 |
| 9,791,362 B2 | 10/2017 | Fox et al. | |
| 11,215,609 B2 * | 1/2022 | Tong | G01N 1/18 |
| 2002/0015664 A1 * | 2/2002 | Sklar | G01N 15/1404 436/63 |
| 2002/0192113 A1 * | 12/2002 | Uffenheimer | G01N 35/1002 422/562 |
| 2004/0062685 A1 | 4/2004 | Norton et al. | |
| 2006/0118167 A1 | 6/2006 | Neas | |
| 2006/0281143 A1 * | 12/2006 | Liu | C12M 23/34 435/297.2 |
| 2007/0065808 A1 | 3/2007 | Bohm et al. | |
| 2007/0212262 A1 | 9/2007 | Rich et al. | |
| 2008/0291425 A1 | 11/2008 | Norton et al. | |
| 2010/0177305 A1 * | 7/2010 | Chen | G01N 15/1434 356/246 |
| 2011/0259749 A1 | 10/2011 | Kanda | |
| 2012/0103112 A1 | 5/2012 | Vrane et al. | |
| 2013/0343149 A1 * | 12/2013 | Fox | B01F 33/30 366/152.2 |
| 2014/0188039 A1 | 7/2014 | Andrew et al. | |
| 2014/0208875 A1 * | 7/2014 | Muraki | G01N 15/1404 422/534 |
| 2015/0146962 A1 * | 5/2015 | Roberts | G05D 7/0658 382/133 |
| 2015/0153263 A1 | 6/2015 | Yan et al. | |
| 2016/0061711 A1 * | 3/2016 | Deka | G01N 15/1459 435/7.25 |
| 2016/0377524 A1 | 12/2016 | Martin et al. | |
| 2017/0045504 A1 | 2/2017 | Blom et al. | |
| 2017/0224464 A1 | 8/2017 | Kakimoto et al. | |
| 2017/0248515 A1 * | 8/2017 | Duckett, Jr. | G01N 21/0303 |
| 2017/0266655 A1 * | 9/2017 | Muraki | G01N 15/1459 |
| 2017/0297023 A1 | 10/2017 | Lin | |
| 2018/0156710 A1 | 6/2018 | Vrane et al. | |
| 2020/0056979 A1 | 2/2020 | Ghazi | |
| 2020/0319088 A1 * | 10/2020 | Ota | G01N 33/4915 |
| 2021/0172854 A1 * | 6/2021 | Saito | G01N 15/1459 |
| 2022/0034783 A1 * | 2/2022 | Vrane | G01N 15/1404 |
| 2022/0323959 A1 * | 10/2022 | Kanda | B01L 3/502784 |

FOREIGN PATENT DOCUMENTS

| | | | |
|---|---|---|---|
| WO | WO2012067767 | 5/2012 | |
| WO | WO2012067767 A1 | 5/2012 | |
| WO | WO2014169231 A1 | 10/2014 | |
| WO | WO2017180300 | 10/2017 | |
| WO | WO2017180300 A1 | 10/2017 | |
| WO | WO-2019207990 A1 * | 10/2019 | G01N 15/1404 |
| WO | WO2020036730 A1 | 2/2020 | |

* cited by examiner

FLUID MANAGEMENT SYSTEM FOR AN ANALYZER AND/OR SORTER TYPE FLOW TYPE PARTICLE ANALYZER USING A DETACHABLE CONNECTOR

CROSS-REFERENCE TO RELATED APPLICATION

Pursuant to 35 U.S.C. § 119 (e), this application claims priority to the filing date of U.S. Provisional Patent Application Ser. No. 63/179,024 filed Apr. 23, 2021; the disclosure of which application is incorporated herein by reference in their entirety.

INTRODUCTION

Flow-type particle analyzers, such as flow cytometers, are well known analytical tools that enable the characterization of particles on the basis of optical parameters such as light scatter and fluorescence, or by electrical properties, such as impedance. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection, and a multiplicity of different particles or components may be simultaneously detected by using spectrally distinct fluorescent dyes to label the different particles or components. Typically, detection is carried out using a multiplicity of photodetectors, one for each distinct dye to be detected.

In some flow cytometers, a sheath fluid is provided to the flow cell by a pressure driven fluidics system where the sample fluid and sheath fluid are passed through the flow cell under pressure greater than ambient pressure. Changes in the flow rate through the flow cell are achieved by varying the pressure in the sheath fluid reservoir and the ratio of sample fluid to sheath fluid in hydrodynamic flow is determined by the exerted pressure in the sample source and sheath fluid reservoir, as well as by the resistance of the fluidic system supplying the sample and sheath fluid. Flow cytometers can also use a vacuum-driven fluidics system where a vacuum pump draws vacuum downstream from the flow cell and the sample and sheath fluids remain at ambient pressure. To change the rate through the flow cell, vacuum is drawn by the vacuum pump and the ratio of sample fluid to sheath fluid that flows through the flow cell is determined by the ratio of the resistance exerted by the paths of the sample fluid and sheath fluid systems. Fluidic systems providing a hydrodynamically focused flow of particle-containing sample fluid in the center of a particle-free sheath fluid stream often utilize pressurizable tubings, connections and seals that are required to withstand wide ranges of pressure levels, in particular high and low pressures.

SUMMARY

Several problems with respect to fluid management in conventional flow type particle analyzers have been realized by the present inventors. In particular, the inventors have realized that fluid management systems in flow type particle analyzers are configured in a manner that makes it difficult to fully clean all the fluid pathways or flow a cleaning fluid such that it flows through all volumes in the fluid management system. For example, the fluid management systems may have fluid pathways arranged in such a way that a cleaning fluid never flows through a volume in a particular fluid pathway. The inventors have solved this problem by providing fluid management systems having a fluid supply subsystem that allows for 100% swept cleaning of the fluid management systems and/or components thereof (e.g., a fluid pathway of a fluid management system configured for flowing a primary fluid to a flow cell). The 100% swept cleaning may be enabled by providing a fluid supply subsystem that flows a cleaning fluid through the same fluid pathways that deliver a primary fluid, e.g., sheath fluid, to the flow cell. The fluid supply subsystem may have a manual connection that can be coupled to a primary fluid source or alternatively be coupled to one or more secondary fluid sources such that the secondary fluid sources, e.g., cleaning fluid sources, may flow through the same fluid pathways as the primary fluid source. In exemplary methods where cleaning of a system is desired after analysis of a sample, the manual connection may be disconnected from a primary fluid source connector and connected to a secondary fluid source connector fluidically coupled to one or more secondary fluid sources.

In addition, the inventors have realized that the waste management configurations in flow type particle analyzers are complex and not cost-effective to produce and operate. For example, the multiple waste fluids generated in flow type particle analyzers typically require management by multiple waste pumps and pathways. The inventors have solved this problem by providing a waste management subsystem managed by a single fluid movement device, e.g., a single waste pump and no other fluid movement devices. All the different waste fluids of the system generated from, e.g., particle analysis and/or sorting and cleaning of the flow type particle analyzer, may be conveyed or drawn by the single fluid movement device to a waste fluid container. The fluid resistances of flow paths from the waste sources in the fluid management system may be balanced to allow for a single fluid movement device to manage the waste fluid from each of the waste sources. For example, the fluid resistances of fluidic lines fluidically coupling the waste sources to the fluid movement device may be balanced to provide a proper vacuum for each waste source.

The inventors have further realized that flexibility to perform multiple functions with a single flow type particle analyzer system is desirable in particle analysis workflows. As such, the inventors have provided flow type particle analyzers having hybrid fluid management systems configured to allow switching between (a) particle analyzing (e.g., analyzer mode) and (b) particle analyzing and sorting (e.g., sorter mode). The flow type particle analyzer with a hybrid fluid management system may have all components to perform either (a) particle analyzing and (b) particle analyzing and sorting including, e.g., an analyzer waste fluid collection subsystem, a sort block, a sample collection system, and sorter waste fluid collection subsystem. In certain analyzer mode embodiments, waste fluid from an output of a cuvette may be collected by an analyzer waste fluid collection subsystem that is fluidically coupled to the output of the cuvette. In certain sorter mode embodiments, a sort block may be coupled to the output of the cuvette, and waste fluid from the sort block may be collected by a sorter waste fluid collection subsystem that is fluidically coupled to an output of the sort block, e.g., positioned in droplet receiving relationship with an output of the sort block. Sorted particles of interest may be collected by a sample collection system having one or more sample collection containers. The hybrid aspect of the system which allows switching between analyzing and sorting modes may be accomplished by having the sort block (e.g., which may include a sorting nozzle and deflection plates) and the connection to the analyzer waste fluid collection subsystem, e.g., the connection to a vented waste accumulator, both be manual and identical connections to the cuvette.

Fluid management systems for flow type particle analyzers are provided. Aspects of the fluid management systems include a flow cell comprising an input and output; a cuvette comprising an input coupled to the output of the flow cell and further comprising an output; a sample input line for fluidically coupling a sample fluid source to the input of the flow cell; and a fluid supply subsystem configured to alternatively fluidically couple: (a) a primary fluid source; or (b) one or more secondary fluid sources, to the input of the flow cell. Also provided are methods of using flow type particle analyzers having the subject fluid management systems.

BRIEF DESCRIPTION OF THE DRAWINGS

The invention may be best understood from the following detailed description when read in conjunction with the accompanying drawings. Included in the drawings are the following figures.

DETAILED DESCRIPTION

Figure 1:
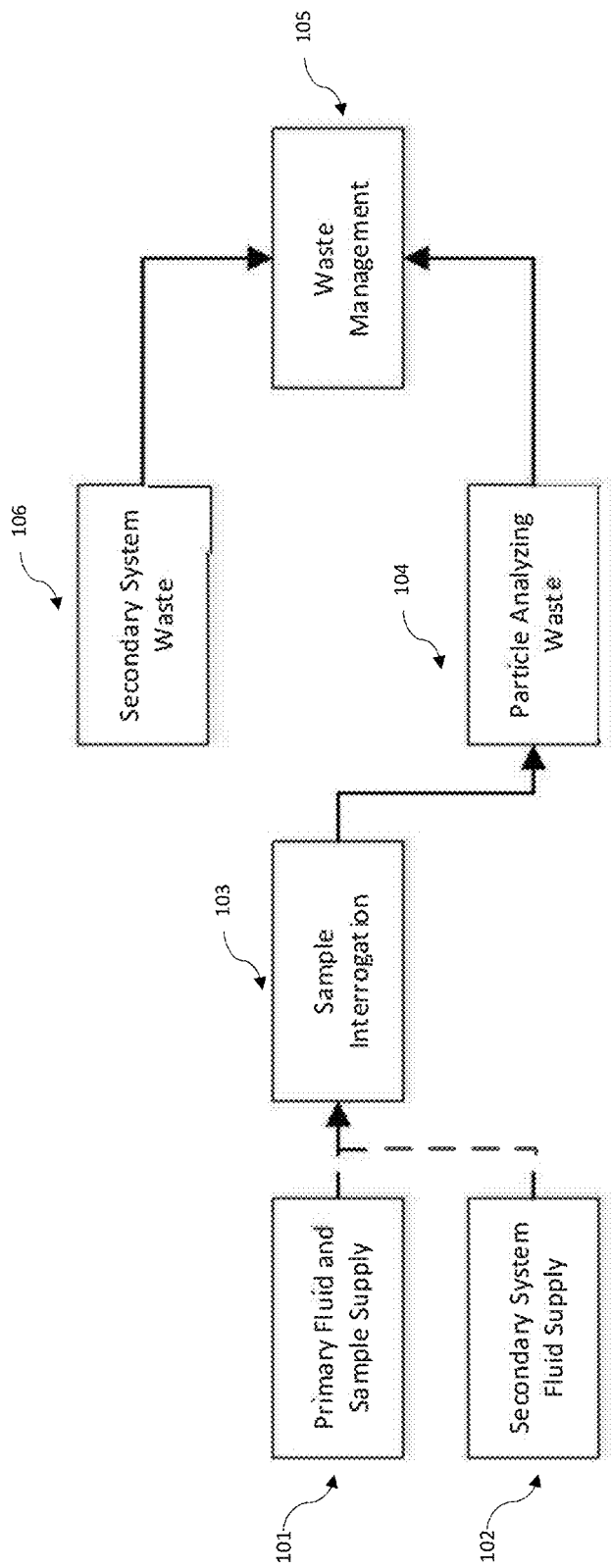
FIG. 1 provides a flow chart of the primary functions of a fluid management system of a particle analyzer configured to analyze a sample, according to certain embodiments.

Fluid management systems for flow type particle analyzers are provided. Aspects of the fluid management systems include a flow cell comprising an input and output; a cuvette comprising an input coupled to the output of the flow cell and further comprising an output; a sample input line for fluidically coupling a sample fluid source to the input of the flow cell; and a fluid supply subsystem configured to alternatively fluidically couple: (a) a primary fluid source; or (b) one or more secondary fluid sources, to the input of the flow cell. Also provided are methods of using flow type particle analyzers having the subject fluid management systems.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

In further describing aspects of the invention, embodiments of fluid management systems and flow type particle analyzers including the same are reviewed first in greater detail. Next, a review of methods of using the flow particle analyzers is provided.

Flow Type Particle Analyzers

As summarized above, flow type particle analyzers including a fluid management system are provided. The fluid management systems of the flow type particle analyzers may be configured to manage fluid flow (e.g., sample fluid, primary fluid, secondary fluid, and waste fluid flow) in the flow type particle analyzer. Fluid management systems may be configured to transport fluids such as, e.g., sample fluids, primary fluids, and cleaning fluids, to the flow cell and waste fluids from sample interrogation or cleaning to a waste storage location. The sample fluid and primary fluid (e.g., sheath fluid) may be flowed under pressure in a controlled ratio to a cuvette for interrogation of particles in the sample fluid. The fluid management system may modulate the flow rate of the sample fluid and primary fluid through a flow cell and cuvette to hydrodynamically focus the sample fluid. The fluid management systems may further be configured to manage the collection and storage of waste fluids obtained from sample analysis or sample analysis and sorting. The fluid management systems may further be configured to manage the collection and storage of waste fluids from cleaning any part of the flow type particle analyzer.

Flow type particle analyzers, such as flow cytometers, typically include a sample fluid source containing a sample fluid, such as, e.g., described below, and a primary fluid source containing a primary fluid, e.g., a sheath fluid. The flow type particle analyzer transports particles (such as cells) in the sample fluid as a particulate stream to a flow cell, while also directing the primary fluid, e.g., sheath fluid, into the flow cell via a flow cell input. Within the flow cell, a liquid sheath is formed around the particulate stream to impart a substantially uniform velocity on the particulate stream. Hydrodynamically focused particles, e.g., cells, within the stream may pass through the center of a light source in an interrogation region, e.g., a cuvette. Light from the interrogation region, e.g., in the form of scattered light (such as side scattered or forward scattered light) as well as emitted fluorescent light, is then detected by a suitable optical detection system. Fluid leaving the output of the cuvette enters a waste fluid management system, which conveys fluid from the output of the cuvette to a waste reservoir.

The fluid management systems of the present disclosure may be configured to perform one or more functions including, but not limited to, supplying a primary fluid (e.g., sheath fluid) and sample fluid in a controlled ratio to a flow cell; supplying one or more secondary fluids (e.g., for cleaning) to the flow cell; hydrodynamic focusing of a sample fluid using a primary fluid for sample interrogation through a cuvette; collecting an analyzed sample as waste; collecting waste from sorting a sample; and managing and storing all system waste; etc. The fluid management systems may include a flow cell comprising an input and output, a cuvette comprising an input coupled to the output of the flow cell and further comprising an output, a sample input line for fluidically coupling a sample fluid source to the input of the flow cell, and any of the subsystems described herein.

In certain embodiments, the fluid management systems are configured to alternatively perform one or more functions. For example, a fluid management system may perform function (a) or perform function (b), an alternative to function (a). In some instances, the fluid management system is configured to allow a user to manually select which function among a group of alternative functions to perform. By "manually" is meant a user may configure (e.g., couple, connect, position) fluidic subsystems or components thereof to enable a desired function. For example, a user may manually couple or connect, e.g., by hand, a connector of a subsystem to a mating connector of a fluid source or the output of the cuvette to enable a desired function that can now be performed due to the fluidic coupling of the subsystem with the fluid source or the cuvette.

In certain embodiments, a fluid management system is configured to alternatively supply (a) a primary fluid or (b) one or more secondary fluids to a flow cell. In such embodiments, the fluid management system may include all necessary components to supply (a) a primary fluid and (b) one or more secondary fluids to a flow cell but only one of (a) and (b) may be supplied to the flow cell at a time. In some embodiments, the fluid management system is configured in a manner such that it is capable of supplying (a) a primary fluid to the input of the flow cell and is capable of supplying (b) one or more secondary fluids to the input of the flow cell but either (a) a primary fluid is supplied in some instances or (b) one or more secondary fluids are supplied in other instances.

In certain embodiments, the fluid management system is configured to alternatively (a) analyze a sample (e.g., particles in sample fluid) or (b) analyze and sort a sample (e.g., particles in sample fluid). In such embodiments, the fluid management system may include all necessary components to (a) analyze a sample or (b) analyze and sort a sample but only one of (a) and (b) may be performed at a time. In some embodiments, the fluid management system is configured in a manner such that it is capable of (a) analyzing a sample and is capable of (b) analyzing and sorting a sample but either (a) analyzing a sample is performed in some instances or (b) analyzing and sorting a sample is performed in other instances.

Aspects of fluid management by the fluid management systems may be based on the fluid circuit principle. For example, the fundamental principle of primary fluid supply may be based upon the fluid circuit principle, where the pressure drop across a closed fluid pathway is assumed equal to the product of liquid flowrate and fluid resistance. Primary fluid (e.g., sheath) and sample pathways can be modeled as two resistors in parallel, combining to travel through a flow cell, cuvette, and waste path which are a third fluid resistor. Similarly, waste management using a single waste pump according to certain embodiments is based upon the fluid circuit principle. Every individual waste aspiration source can be modeled as a fluid reservoir at atmospheric pressure, and every connection (e.g., fluidic line) from these waste sources to the waste management system can be modeled as a fluid resistor. Given the supply vacuum of a waste pump, the fluid resistance of each connection can be controlled to balance the required waste aspiration of each waste source, as described further in detail below.

The fluid management systems of the present disclosure may be configured for 100% swept cleaning. By "100% swept" is meant that fluid is flowed through all volumes in a fluid pathway. In certain embodiments, the fluid management systems of the present disclosure are configured such that all fluid pathways in the fluid management systems are 100% swept and cleaned by a cleaning fluid that is, e.g., supplied by a fluid supply pump. In certain embodiments, the fluid management systems are configured such that all of the fluid supply pathway is 100% swept and cleaned by a cleaning fluid that is, e.g., supplied by a fluid supply pump. The fluid supply pathway may include, e.g., tubing, the fluid supply subsystem, the flow cell, cuvette, and other components that facilitate fluid supply to the flow cell. In some instances, the fluid management systems are configured such that all of a primary fluid pathway is 100% swept and cleaned by a cleaning fluid that is, e.g., supplied by a fluid supply pump. The primary fluid pathway may include any of, e.g., the fluid supply subsystem, flow cell, cuvette, and other components that facilitate primary fluid supply to the flow cell. In some instances, the one or more cleaning fluids are supplied by a fluid movement device, e.g., a pump fluidically coupling the one or more secondary fluid sources to the fluid supply subsystem. The 100% swept cleaning of the fluid management system may be enabled by the configuration of fluid supply subsystem. The fluid supply subsystem may be configured such that one or more secondary fluids flow through the same fluid pathway(s) used to flow primary fluid to the flow cell. The fluid supply subsystem may have a manual connection, e.g., as described further in detail below, that fluidically couples the fluid supply subsystem to the primary fluid (e.g., sheath) source or alternatively fluidically couples the fluid supply subsystem to one or more secondary fluid (e.g., cleaning) sources. The one or more secondary fluids may be supplied by a fluid movement device, e.g., a fluid supply pump, to the fluid supply subsystem and flow cell.

The waste fluids of a flow type particle analyzer of the present disclosure may be managed by a fluid movement device, according to certain embodiments. In some instances, the waste fluids of the fluid management system, e.g., the combined waste fluids, are managed by a single fluid movement device, e.g., a single waste pump. The combined waste fluid may be managed by a single fluid movement device, e.g., single waste pump, by having a proper balance of fluid resistances from all of the different waste sources of the system such as, e.g., analyzer waste, sorted waste, and secondary system waste. The waste sources may include, e.g., an analyzer waste fluid collection subsystem, a sorter waste fluid collection subsystem, and one or more system waste fluid sources. Connections (e.g., fluidic lines) from the waste sources may act as multiple fluid resistors in parallel with a single pressure source including the fluid movement device, e.g., waste vacuum pump. As long as the fluid movement device, e.g., waste vacuum pump, has sufficient capacity, the resistances can be tuned such that each waste source has proper vacuum. For example, the resistances of the flow paths (e.g., fluidic lines) that fluidically couple waste sources of the system to the fluid movement device may have known resistances that are balanced to allow for each waste source to have a proper vacuum for drawing waste fluid. In some instances, the resistance of a first fluidic line coupled to a first waste source among a plurality of fluidic lines coupling a plurality of waste sources to a fluid movement device may be adjusted or set to provide a proper vacuum for the first waste source. The resistance of a second fluidic line coupled to a second waste source among a plurality of fluidic lines coupling a plurality of waste sources to a fluid movement device may be adjusted or set to provide a proper vacuum for the second waste source. Resistances of additional fluidic lines in the system may further have individual resistances that are adjusted or set to provide a proper vacuum for each of the respective waste sources. The resistances of the fluidic lines from each of the waste sources may be the same or different. Each fluidic line fluidically coupling a waste source to the fluid movement device may have a particular known resistance such that each of the waste sources has proper vacuum. For example, resistances of fluidic lines coupling one or more of an analyzer waste fluid collection subsystem, a sorter waste fluid collection subsystem, and one or more system waste fluid sources to the fluid movement device may be balanced to allow for proper vacuum for each waste source and control of waste fluid aspiration by a single fluid movement device. In some instances, the resistances of a plurality of fluidic lines coupling a plurality of waste sources to a fluid movement device may be individually adjusted to provide a desired fluid flow rate from each respective waste source. For example, the resistance of a first fluidic line coupled to a first waste source among a plurality of fluidic lines coupling a plurality of waste sources to a fluid movement device may be adjusted or set to provide a desired first flow rate of waste fluid from the first waste source. The resistance of a second fluidic line coupled to a second waste source among a plurality of fluidic lines coupling a plurality of waste sources to a fluid movement device may be adjusted or set to provide a desired second flow rate of waste fluid from the second waste source. Resistances of additional fluidic lines in the system may further have individual resistances that are adjusted or set to provide a desired flow rate of waste fluid from each of the respective waste sources. The resistances of the fluidic lines from each of the waste sources may be the same or different. Each fluidic line fluidically coupling a waste source to the fluid movement device may have a particular known resistance based on the desired fluid flow rate from each of the waste sources. In some instances, the resistances of the flow paths (e.g., fluidic lines) in a fluid management system are fixed. In some instances, the resistances of the flow paths (e.g., fluidic lines) in a fluid management system are variable. In some instances, the resistance of one or more flow paths in the system may be independently variable, where, e.g., the resistance of each of the flow paths may be individually varied. In some instances, the system includes one or more variable resistors that may modulate the resistance of a flow path by, e.g., modulating a dimension of the flow path (e.g., diameter or length of a fluidic line). In some instances, the variable resistor includes a valve.

Fluid management systems of the present disclosure may further include one or more waste fluid collection subsystems. In some instances, a fluid management system includes an analyzer waste fluid collection subsystem configured to fluidically couple the output of the cuvette to a waste management subsystem; a sorter waste fluid collection subsystem configured to fluidically couple an output of a sort block coupled to the output of the cuvette to a waste management subsystem; or a combination thereof (e.g., in hybrid system where the flow type particle analyzer may (a) analyze a sample or alternatively (b) analyze and sort a sample).

Methods

Also provided are methods of using a flow type particle analyzer that includes a fluid management system according to any of the embodiments described herein. The methods may include flowing fluid in a flow type particle analyzer including a fluid management system according to any of the embodiments described herein. Any suitable fluids are flowed in the flow type particle analyzer including, e.g., sample fluid, primary fluid, and secondary fluid. In practicing embodiments of the methods, the methods may include flowing fluid in a flow type particle analyzer comprising a fluid management system comprising: a flow cell comprising an input and output; a cuvette comprising an input coupled to the output of the flow cell and further comprising an output; a sample input line fluidically coupling a sample fluid source to the input of the flow cell; and a fluid supply subsystem configured to alternatively fluidically couple: (a) a primary fluid source; or (b) one or more secondary fluid sources, to the input of the flow cell; wherein the input of the flow cell is fluidically coupled to either the primary fluid source or the one or more secondary fluid sources.

In some embodiments, the sample flowed in the system includes a plurality of fluorophores, where one or more of the fluorophores have overlapping fluorescence spectra. In some instances, the methods further include spectrally resolving the light from each type of fluorophore in the sample, such as by calculating a spectral unmixing matrix for the fluorescence spectra of each type of fluorophore in the sample. In certain embodiments, methods include determining the overlap of the spectra of light from the flow stream and calculating the contribution of each to the overlapping detected light spectra. In certain embodiments, methods include calculating a spectral unmixing matrix to estimate the abundance of each contribution to the detected light signal by the photodetectors. In certain instances, the spectral unmixing matrix is calculated using a weighted least squares algorithm. In some embodiments, the generated data signals from the light from the free fluorophores in the sample are weighted based on the calculated baseline noise of the photodetector.

In certain embodiments, methods include spectrally resolving light (e.g., weighted using the calculated baseline noise of each photodetector) detected by the plurality of photodetectors such as described e.g., in International Patent Application No. PCT/US2019/068395 filed on Dec. 23, 2019; U.S. patent application Ser. No. 17/159,453 filed on Jan. 27, 2021 and U.S. Provisional Patent Application No. 63/010,890 filed on Apr. 16, 2020, the disclosures of which are herein incorporated by reference in their entirety. For example, spectrally resolving light detected by the plurality of photodetectors may be include solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

Various aspects of the fluid management systems and methods of using the same will be now be further described.

Fluid Supply Subsystem

The fluid management systems of the present disclosure include a fluid supply subsystem configured to supply fluid to a flow cell. The fluid supply subsystem may be fluidically coupled to the input of a flow cell. The fluid supply subsystem may be configured to alternatively supply (a) a primary fluid or (b) one or more secondary fluids to the input of the flow cell. By "alternatively supply" is meant that the fluid supply subsystem is configured in a manner such that it is capable of supplying (a) a primary fluid to the input of the flow cell and is capable of supplying (b) one or more secondary fluids to the input of the flow cell but only one of (a) a primary fluid and (b) one or more secondary fluids may be supplied at a time. For example, the fluid supply subsystem may be configured in a manner where it is capable of supplying (a) a primary fluid to the input of the flow cell and is capable of supply (b) one or more secondary fluids to the input of the flow cell but either (a) a primary fluid is supplied in some instances or (b) one or more secondary fluids are supplied in other instances. The fluid supply subsystem may be configured to alternatively fluidically couple: (a) a primary fluid source or (b) one or more secondary fluid sources to the input of the flow cell. "By alternatively fluidically couple" is meant that the fluid subsystem is configured in a manner such that it is capable of fluidically coupling (a) a primary fluid source to the input of the flow cell and is capable of fluidically coupling (b) one or more secondary fluid sources to the input of the flow cell but only one of (a) a primary fluid source and (b) one or more secondary fluid sources may be fluidically coupled to the input of the flow cell at a time. For example, the fluid supply subsystem may be configured in a manner where it is capable of fluidically coupling (a) a primary fluid source to the input of the flow cell and is capable of fluidically coupling (b) one or more secondary fluid sources to the input of the flow cell but either (a) a primary fluid source is coupled to the input of the flow cell in some instances or (b) one or more secondary fluid sources are coupled to the input of the flow cell in other instances. The selection of whether to supply a primary fluid or, alternatively, one or more secondary fluids may be done manually by a user. By "manually" is meant a user may configure, e.g., couple, connect, position, the fluid supply subsystem or a component thereof to enable the supply of primary fluid or alternatively, one or more secondary fluids as desired. In such embodiments, the user may manually fluidically couple the fluid supply subsystem to (a) a primary fluid source or alternatively, (b) one or more secondary fluid sources by connecting a fluid supply subsystem connector with (a) a primary fluid source connector or (b) a secondary fluid source connector. The system may be configured to provide for manual selection using any convenient format, such as providing detachable connections such as, e.g., quick-disconnect connections.

The fluid supply subsystem may be configured to allow for 100% swept cleaning of the fluid management system or a fluid pathway thereof (e.g., primary fluid pathway for supplying primary fluid to the flow cell). The fluid supply subsystem may be configured such that the primary fluid and the one or more secondary fluids flow through the same fluid pathway(s) in the fluid management system. The 100% swept cleaning may be enabled by the fluid supply subsystem having a manual connection, e.g., as described further in detail below, that may be fluidically coupled to the primary fluid (e.g., sheath) source (e.g., by way of a primary fluid source connector) or alternatively be fluidically coupled to one or more secondary fluid (e.g., cleaning) sources (e.g., by way of a secondary fluid source connector) supplied by a fluid movement device, e.g., a fluid supply pump. The primary fluid source and the one or more secondary fluid sources may share the same manual fitting connection that connects to the fluid supply subsystem. In such embodiments, every piece of the system (other than the primary fluid source itself) can be cleaned by the same fluid, e.g., the cleaning fluid conveyed to the fluid supply subsystem from the one or more secondary fluid sources. Where desired, the primary fluid source, e.g., sheath fluid container, may be cleaned separately, such as, e.g., by using an autoclaving cycle. The fluid supply subsystem may include any fluidics system which directs or conveys primary or secondary fluids to their designated locations (e.g., the flow cell), where the system may include tubing, valves, manifolds, etc.

In some instances, the fluid supply subsystem includes a fluid supply subsystem connector configured to fluidically couple a primary fluid source or, alternatively, one or more secondary fluid sources, to the fluid supply subsystem. In some instances, the fluid supply subsystem includes a fluid supply subsystem connector configured to detachably connect to a primary fluid source connector or a secondary fluid source connector. By "detachably connect" is meant that a connector may be attached to and then subsequently at some point be detached from a second connector, e.g., mating connector, as desired. In some instances, the primary fluid source connector is fluidically coupled to a primary fluid source. In some instances, the secondary fluid source connector is fluidically coupled to one or more secondary fluid sources. In some instances, the secondary fluid source connector is fluidically coupled to a fluid movement device that is fluidically coupled to one or more secondary fluid sources. In some embodiments, the fluid supply subsystem connector provides a sterile connection with the primary fluid source connector or the secondary fluid source connector. By "sterile" is meant that the connection is isolated from live bacteria or other microorganisms that are present in the ambient environment. The fluid supply subsystem connector, primary fluid source connector, and secondary fluid source connector may be any suitable fittings or connectors including, e.g., quick disconnect connectors, threaded connectors, luer connectors, multiport connectors, tri clamp fittings, and puncture and seal sterile fittings. Suitable quick disconnect connectors include, but are not limited to, snap-type (hall-latching) connectors, bayonet connectors, threaded connectors, non-latching connectors, single-shutoff connectors, double-shutoff connectors, non-shutoff connectors, dry break connectors, roller lock connectors, pin lock connectors, ring lock connectors, and cam lock connectors.

In certain embodiments, the fluid management system includes a fluid movement device configured to convey, e.g., mechanically convey, one or more secondary fluids from one or more secondary fluid sources to the fluid supply subsystem. Suitable fluid movement devices may include, e.g., devices that move fluids by mechanical action. The fluid movement device may be fluidically coupled to one or more secondary fluid sources. In certain embodiments, when the fluid supply subsystem is fluidically coupled to the one or more secondary fluid sources, the fluid movement device may convey one or more secondary fluids to the fluid supply subsystem. In some instances, when a fluid supply subsystem connector is fluidically coupled to the secondary fluid source connector, one or more secondary fluids may be conveyed to the fluid supply subsystem by the fluid movement device. In some instances, the fluid movement device includes a pump, e.g., a fluid supply pump. The pump may be a positive displacement pump. As used herein, a "positive displacement pump" refers to pumps that move fluid by trapping a fixed amount of fluid and forcing (displacing) that trapped volume out of the device, where such pumps may operate with a series of working cycles, each cycle trapping a certain volume of fluid and moving the fluid mechanically through the pump and into a fluidic system. Positive displacement pumps that may be employed include, but are not limited to: rotary-type positive displacement pumps, such as peristaltic pumps, internal gear pumps, screw pumps, shuttle block pumps, flexible vane or sliding vane pumps, circumferential piston pumps, flexible impeller pumps, helical twisted roots pumps or liquid-ring pumps; reciprocating-type positive displacement pumps, such as piston pumps, plunger pumps or diaphragm pumps; and linear-type positive displacement pumps, such as rope pumps and chain pumps. In certain embodiments, the positive displacement pump includes a pump selected from the group consisting of a peristaltic pump, gear pump and a diaphragm pump. In some instances, the positive displacement pump is a peristaltic pump.

Waste Management Subsystem

Fluid management systems of the present disclosure may further include a waste management subsystem. The waste management subsystem may be configured to receive and, in some instances combine, system waste fluids which may include, e.g., waste from analyzing a sample, waste from sorting a sample, and secondary waste fluids from cleaning operations. The waste management system can be any system of fluid management (including, e.g., tubes, valves, manifolds) which combines multiple sources of waste in parallel to an output, e.g., a single output.

The waste management subsystem may be configured to receive and combine waste fluids from: (a) one or more system waste fluid sources and (b) an analyzer waste fluid collection subsystem, a sorter waste fluid collection subsystem, or a combination thereof to produce a combined waste fluid. Fluid from a system waste fluid source may include waste fluid produced and/or collected from cleaning any part of the flow type particle analyzer. Fluid from an analyzer waste fluid collection subsystem may include analyzed waste fluid from the output of the cuvette which may include, e.g., analyzed sample fluid and primary fluid that has flown through the cuvette and been optically interrogated. Fluid from a sorter waste fluid collection subsystem may include waste fluid received and collected from an output of a sort block, e.g., an output of a sort nozzle. The waste fluid may include analyzed primary fluid and sample fluid (e.g., including particles not of interest) that was not conveyed, e.g., in droplets, to a sample collection container by one or more deflection plates of the sort block. In certain embodiments, the waste management subsystem is configured to receive and combine waste fluids from: (a) one or more system waste fluid sources and (b) an analyzer waste fluid collection subsystem to produce a combined waste fluid. In certain embodiments, the waste management subsystem is configured to receive and combine waste fluids from: (a) one or more system waste fluid sources and (b) a sorter waste fluid collection subsystem to produce a combined waste fluid. In certain embodiments, the waste management subsystem is configured to receive and combine waste fluids from: (a) one or more system waste fluid sources and (b) an analyzer waste fluid collection subsystem and a sorter waste fluid collection subsystem. In certain embodiments, the waste management subsystem is configured to receive and combine waste fluids from: (a) one or more system waste fluid sources and (b) an analyzer waste fluid collection subsystem or a sorter waste fluid collection subsystem.

The waste management subsystem may be fluidically coupled to (a) one or more system waste fluid sources and (b) an analyzer waste fluid collection subsystem, a sorter waste fluid collection subsystem, or a combination thereof. In certain embodiments, the waste management subsystem is fluidically coupled to (a) one or more system waste fluid sources and (b) an analyzer waste fluid collection subsystem. In certain embodiments, the waste management subsystem is fluidically coupled to (a) one or more system waste fluid sources and (b) a sorter waste fluid collection subsystem. In certain embodiments, the waste management subsystem is fluidically coupled to (a) one or more system waste fluid sources and (b) an analyzer waste fluid collection subsystem and a sorter waste fluid collection subsystem.

The waste management subsystem may include an output, e.g., a single output, for the combined waste fluid. In some instances, the output of the waste management subsystem is fluidically coupled to a waste fluid container. A fluidic line, e.g., a tube or conduit, may fluidically couple the output of the waste management subsystem to the waste container. In some instances, the output is fluidically coupled to the waste container with a single fluidic line. Combined waste fluid may be flowed out of the output and into the waste fluid container, e.g., for storage. The waste container may be fluidically coupled, e.g., via a fluidic line (e.g., a single fluidic line), to a fluid movement device configured to convey combined waste fluid from the output of the waste management subsystem to the waste fluid container. In some instances, the waste fluid container is detachable from a fluidic line that couples it to the fluid management system such that, e.g., the waste fluid container may be emptied and cleaned.

Where desired, the fluid management system may include a fluid movement device configured to convey, e.g., mechanically convey, the combined waste fluid to the waste fluid container. In some instances, the combined waste fluid is managed by a single fluid movement device, e.g., a single pump. In these embodiments, as there is only a single fluid movement device, the fluid management system does not include any other fluid movement devices that control or modulate the flow of the combined waste fluid to the waste container. In some embodiments, a single fluidic line may couple the output of the waste management subsystem to a waste container. In some embodiments, a single fluidic line may fluidically couple an output of the waste management system to a single fluid movement device which in turn is fluidically coupled to a waste fluid container with a single fluidic line. In some instances, the combined waste fluid is conveyed from the output of the waste management subsystem to the waste fluid container by a single fluid movement device, e.g., a single pump. In some instances, the fluid movement device is a vacuum source that draws the combined waste fluid from the output of the fluid management subsystem to the waste fluid container. In some instances, the fluid movement device conveys waste fluid from each of the subsystems or waste sources (e.g., analyzer waste fluid collection subsystem, sorter waste fluid collection subsystem, system waste fluid source(s)) to the waste management subsystem, e.g., to be combined, and then conveys the combined waste fluid to a waste container. In some instances, waste fluid from each of the subsystems or waste sources fluidically coupled to the waste management subsystem is managed by a single fluid movement device. In some instances, the fluid movement device is a vacuum source that draws the waste fluid from each of the subsystems or waste sources to the waste management subsystem. The fluid movement device may be fluidically coupled to an output of the waste management subsystem and a waste fluid container. The fluid movement device may be any fluid movement device as described herein. In some instances, the fluid movement device is a vacuum imparting device. In some instances, the fluid movement device includes a pump, e.g., a vacuum pump. In some instances, the fluid movement device is a single pump. In some instances, the pump includes a positive displacement vacuum pump. In some instances, the positive displacement vacuum pump includes a pump selected from the group consisting of a diaphragm pump, gear pump and a peristaltic pump. In some instances, the positive displacement vacuum pump is a diaphragm pump.

The fluid management systems may include one or more system waste fluid sources fluidically coupled to the waste management subsystem. The one or more system waste fluid sources may produce and/or collect waste fluids from the cleaning of any region or location of the flow type particle analyzer. The one or more system waste fluid sources may be configured to convey or deliver system waste fluids to the waste management subsystem. In some instances, waste fluid from the one or more system waste fluid sources is drawn to the waste management subsystem by a vacuum created by a fluid movement device. The one or more waste fluid sources may be fluidically coupled to the waste management subsystem with a known fluid resistance. In some instances, one or more fluidic lines coupling the one or more system waste fluid sources to the waste management subsystem, e.g., each of the one or more fluidic lines, includes a resistor. The resistor(s) may provide a known fluid resistance in the one or more fluidic lines coupling the one or more system waste fluid sources to the waste management subsystem. Suitable resistors include, but are not limited to, a section of tubing with known length and internal diameter, an orifice, etc.

Primary Fluid Pressure Feedback Control Subsystem

The fluid management systems of the present disclosure may further include a primary fluid pressure feedback control subsystem configured to control or regulate primary fluid pressure in the system, e.g., in a primary fluid source. The primary fluid pressure may be controlled via regulated air pressure in the primary fluid source. Pressurized primary fluid may flow from the primary fluid source through the fluid supply subsystem to the flow cell. The primary fluid pressure may be controlled based on a variety of parameters including, e.g., measured fluid level height in the primary fluid source and air pressure in the primary fluid source. Additional parameters may include, but are not limited to, primary fluid flowrate.

The primary fluid pressure feedback control subsystem may include a controller configured to maintain a controlled variable, e.g., fluid pressure, at a desired set point. The controller may be any suitable control system. In some instances, the controller includes a closed-loop control system, e.g., a feedback controller. The system may include any suitable sensors for sensing one or more parameters for feedback signals. In some instances, the controller is configured to receive a signal representing measured primary fluid source air pressure. In some instances, the controller is configured to receive a signal representing measured liquid level height in the primary fluid source. In some instances, the controller is configured to receive a signal representing measured primary fluid source air pressure and a signal representing measured liquid level height in the primary fluid source. In some instances, the controller is configured to determine whether primary fluid pressure has deviated from a set point based on the received signal representing measured primary fluid source air pressure and/or signal representing measured liquid level height in the primary fluid source. In some instances, the controller is configured to send a primary fluid pressure control signal to the primary fluid source air pressure regulator, e.g., to modulate primary fluid source air pressure (and thereby modulate the primary fluid pressure and primary fluid flow rate) where the primary fluid pressure has deviated from a set point. The primary fluid pressure control signal may cause the primary fluid source air pressure regulator to modulate air pressure in the primary fluid source such that the primary fluid pressure matches a desired setpoint. In some instances, the controller is configured to send a primary fluid pressure control signal to a controller of the sample fluid pressure feedback control system. Any suitable feedback control mechanism may be used. Feedback controllers of interest may use control parameters such as, e.g., a proportional gain, an integral term, and/or a derivative term. The control parameters may be applied to an error signal (e.g., a difference between a setpoint and a feedback signal) to calculate an input that is provided to the controlled system or process. In certain embodiments, the controller is a proportional integral derivative (PID) controller.

In some instances, the primary fluid pressure feedback control subsystem includes a primary fluid source air pressure regulator configured to control air pressure in the primary fluid source. The primary fluid source air pressure regulator may be configured to receive a primary fluid pressure control signal from a controller and modulate the air pressure in the primary fluid source (and thereby modulate the fluid pressure). The primary fluid source air pressure regulator may modulate the air pressure in the primary fluid source such that the primary fluid pressure matches a desired setpoint. The primary fluid source air pressure regulator may be gaseously coupled to a pressurized air source. In some instances, the primary fluid source air pressure regulator is gaseously coupled to a primary fluid source. In some instances, an inlet of the primary fluid source air pressure regulator is gaseously coupled to the pressurized air source. In some instances, an outlet of the primary fluid source air pressure regulator is gaseously coupled to the primary fluid source. Any suitable air pressure regulator may be used. Pressure regulators of interest may include, e.g., devices that control (e.g., modulate) a supply (or inlet) pressure to a desired outlet pressure and work to maintain this outlet pressure despite fluctuations in the inlet pressure. In some instances, the primary fluid source air pressure regulator is an electro-pneumatic pressure regulator.

In some instances, the primary fluid pressure feedback control subsystem includes a fluid level measurement device configured to measure the fluid level height in the primary fluid source. The fluid level measurement device may be operatively coupled to the primary fluid source. The output signal of the fluid level measurement device (e.g., representing the measured fluid level) may be sent to a controller of the primary fluid pressure feedback control subsystem according to the embodiments described herein. In some instances, the fluid level measurement device is a point level measurement sensor configured to mark a single discrete liquid height. In some instances, the fluid level measurement device is a continuous level sensor configured to measure fluid level within a range. Suitable fluid level measurement devices include, but are not limited to, glass level gauges, float switches, ultrasonic sensors, capacitance level sensors, hydrostatic devices (e.g., bubblers, displacers, differential pressure transmitters), strain gauges, magnetic level gauges, magnetostrictive level transmitters, laser level transmitters, radar level sensors, guided radar sensors, tuning forks, etc.

Sample Fluid Pressure Feedback Control Subsystem

The fluid management systems of the present disclosure may further include a sample fluid pressure feedback control subsystem configured to control or regulate sample fluid pressure in the system, e.g., in a sample fluid source. The sample fluid pressure may be controlled via regulated air pressure in the sample fluid source. Pressurized sample fluid may be supplied from the sample fluid source directly to the flow cell. The fluid pressure in the sample fluid source may be controlled based on a variety of parameters including, e.g., measured air pressure in the sample fluid source and a primary fluid pressure control signal. Additional parameters may include, but are not limited to, sample liquid level height and sample fluid flow rate.

The sample fluid pressure feedback control subsystem may include a controller configured to maintain a controlled variable, e.g., fluid pressure, at a desired set point. The controller may be any suitable control system. In some instances, the controller includes a closed-loop control system, e.g., a feedback controller. The system may include any suitable sensors for sensing one or more parameters for feedback signals. The sample fluid pressure setpoint may be sheath fluid pressure+desired flow. In such instances, the sample fluid pressure will always be greater than the primary system fluid (e.g., sheath) pressure for positive flow through the system. This allows for dynamic adjustment of the primary system fluid without changing the effective pressure drop of the sample fluid. The systems described herein may provide for control of sample pressure as a differential above primary fluid (e.g., sheath) pressure. This allows for changing primary fluid pressure while keeping sample flowrate constant (P_sample (sample fluid pressure)=P_sheath (sheath fluid pressure)+P_diff (differential pressure). In certain embodiments, the controller is configured to receive a signal representing measured sample fluid source air pressure. In certain embodiments, the controller is configured to receive a primary fluid pressure control signal, e.g., from the controller of the primary fluid pressure feedback control subsystem. In certain embodiments, the controller is configured to receive a signal representing measured sample fluid source air pressure and the primary fluid pressure control signal. In some instances, the controller is configured to determine whether sample fluid pressure has deviated from a set point based on the received signal representing measured sample fluid source air pressure and/or the primary fluid pressure control signal. The controller may be configured to send a sample fluid pressure control signal to the sample fluid source air pressure regulator, e.g., to modulate sample fluid source air pressure (and thereby modulate sample fluid pressure and sample fluid flow rate) where the sample fluid pressure has deviated from a set point. The sample fluid pressure control signal may cause the sample fluid source air pressure regulator to modulate air pressure in the sample fluid source such that the sample fluid pressure matches a desired setpoint. Any suitable feedback control mechanism may be used. Feedback controllers of interest may use control parameters such as, e.g., a proportional gain, an integral term, and/or a derivative term. The control parameters may be applied to an error signal (e.g., a difference between a setpoint and a feedback signal) to calculate an input that is provided to the controlled system or process. In certain embodiments, the controller is a PID controller.

In some instances, the sample fluid pressure feedback control subsystem includes a sample fluid source air pressure regulator configured to control air pressure in the sample fluid source. The sample fluid source air pressure regulator may be configured to receive a sample fluid pressure control signal from a controller and modulate the air pressure in the sample fluid source (and thereby modulate the fluid pressure). The sample fluid source air pressure regulator may modulate the air pressure in the sample fluid source such that the sample fluid pressure matches a desired setpoint. The sample fluid source air pressure regulator may be gaseously coupled to a pressurized air source. In some instances, the sample fluid source air pressure regulator is gaseously coupled to a sample fluid source. In some instances, an inlet of the sample fluid source air pressure regulator is gaseously coupled to a pressurized air source. In some instances, an outlet of the sample fluid source air pressure regulator is gaseously coupled to a sample fluid source. Any suitable air pressure regulator may be used. Pressure regulators of interest may include, e.g., devices that control (e.g., modulate) a supply (or inlet) pressure to a desired outlet pressure and work to maintain this outlet pressure despite fluctuations in the inlet pressure. In some instances, the sample fluid source air pressure regulator is an electro-pneumatic pressure regulator.

Pressurized Air Source

The fluid management systems may include a pressurized air source. The pressurized air source may be used to control the ratio of primary fluid flow to sample fluid flow. The pressurized air source may be configured to supply air pressure to a primary fluid source air pressure regulator and a sample fluid source air pressure regulator of primary fluid and sample fluid pressure feedback control subsystems. The pressurized air source may be gaseously coupled to a primary fluid source air pressure regulator and a sample fluid source air pressure regulator. In some instances, the pressurized air source is a positive pressure source.

Sample Fluid Source

In certain embodiments, the flow type particle analyzer includes a sample fluid source. The sample fluid source may be any suitable reservoir or container (e.g., having rigid or flexible walls) for holding a sample fluid. In some instances, the sample input line of the fluid management system is fluidically coupled to a sample fluid source. The sample fluid container may have a volume ranging from 1 mL to 100 mL; for example, the volume of the container may range from 1 mL to 90 mL, from 1 mL to 80 mL, from 1 mL to 70 mL, from 1 mL to 60 mL, from 1 mL to 50 mL, from 1 mL to 40 mL, from 1 mL to 30 mL, from 1 mL to 20 mL, or from 1 mL to 10 mL.

The sample fluid source may include a sample fluid, and pressurized sample fluid may flow from the sample fluid source to the flow cell. Pressure may be applied to the sample fluid with a pressurized air source and a sample fluid source air pressure regulator gaseously coupled to the sample fluid source. The air pressure in the sample fluid source may be regulated by the sample fluid pressure feedback control subsystem to control sample fluid pressure and flowrate.

Any suitable sample fluid may be used. In some embodiments, the sample fluid contains an initial sample that is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Primary Fluid Source

In some embodiments, the flow type particle analyzer includes a primary fluid source. The primary fluid source many be any suitable reservoir or container (e.g., having rigid or flexible walls) for holding a primary fluid. In certain embodiments, the fluid supply subsystem fluidically couples a primary fluid source to the input of the flow cell. In some instances, the primary fluid source is fluidically coupled to a primary fluid source connector configured to detachably connect to the fluid supply subsystem connector. In some embodiments, the fluid supply subsystem connector is connected to a primary fluid source connector fluidically coupled to a primary fluid source. In some instances, the primary fluid source includes a sheath fluid source, e.g., a container filled with sheath fluid. The primary fluid container may have a volume ranging from 1 L to 100 L; for example, the volume of the container may range from 1 L to 90 L, from 1 L to 80 L, from 1 L to 70 L, from 1 L to 60 L, from 1 L to 50 L, from 1 L to 40 L, from 1 L to 30 L, from 1 L to 20 L, or from 1 L to 10 L.

The primary fluid source may include a primary fluid such as, e.g., a sheath fluid, and pressurized primary fluid may flow from the primary fluid source through the fluid supply subsystem to the flow cell. Pressure may be applied to the primary fluid with a pressurized air source and a primary fluid source air pressure regulator gaseously coupled to the primary fluid source. The air pressure in the primary fluid source may be regulated by the primary fluid pressure feedback control subsystem to control primary fluid pressure and flow rate. In some instances, a fluid level measurement device is operatively coupled to the primary fluid source, e.g., in a manner that allows fluid level sensing in the primary fluid source.

Secondary Fluid Source

In some embodiments, the flow type particle analyzer includes one or more secondary fluid sources. The one or more secondary fluid sources may be any suitable reservoir or container (e.g., having rigid or flexible walls) for holding a secondary fluid. In some instances, the one or more secondary fluid sources include one or more secondary fluids. The one or more secondary fluids may be any suitable system fluid used in a flow type particle analyzer. The one or more secondary fluids may include, e.g., cleaning fluids, buffers, calibrating solutions, setup bead solutions, etc. The flow type particle analyzer may include any suitable number of secondary fluid sources including, e.g., one or more, two or more, three or more, four or more, five or more, six or more, seven or more, eight or more, nine or more, or ten or more secondary fluid sources. The one or more secondary fluid containers may have a volume ranging from 1 L to 100 L; for example, the volume of the container may range from 1 L to 100 L; for example, the volume of the container may range from 1 L to 90 L, from 1 L to 80 L, from 1 L to 70 L, from 1 L to 60 L, from 1 L to 50 L, from 1 L to 40 L, from 1 L to 30 L, from 1 L to 20 L, or from 1 L to 10 L.

In some instances, the fluid supply subsystem fluidically couples one or more secondary fluid sources to the input of the flow cell. One or more secondary fluids may flow from the one or more secondary fluid sources through the fluid supply subsystem to the input of the flow cell. In some instances, the one or more secondary fluids are mechanically conveyed, e.g., pumped, by a fluid movement device to the fluid supply subsystem. In some instances, the fluid supply subsystem connector is connected to a secondary fluid source connector fluidically coupled to one or more secondary fluid sources, e.g., one or more containers filled with secondary fluids.

Waste Fluid Container

In some embodiments, the flow type particle analyzer includes a waste fluid container. The waste container may be any suitable reservoir or container (e.g., having rigid or flexible walls) for storing waste fluids. In some instances, the output of the waste management subsystem is fluidically coupled to the waste fluid container. In some instances, the waste container is fluidically coupled to a fluid movement device configured to convey combined waste fluids from the output of the waste management subsystem to the waste container. A fluidic line, e.g., a tube or conduit, may fluidically couple the output of the waste management subsystem to the waste container. In some instances, the output is fluidically coupled to the waste container with a single fluidic line. Combined waste fluid may be flowed out of the output and into the waste fluid container, e.g., for storage. The waste container may be fluidically coupled, e.g., via a fluidic line (e.g., a single fluidic line), to a fluid movement device configured to convey combined waste fluid from the output of the waste management subsystem to the waste fluid container. In some instances, the waste fluid container is detachable from a fluidic line that couples it to the fluid management system such that, e.g., the waste fluid container may be emptied and cleaned. The waste fluid container may be configured to, e.g., have a suitable volume to, contain and store all system fluids. The waste fluid container may have a volume ranging from 1 L to 100 L; for example, the volume of the container may range from 1 L to 90 L, from 1 L to 80 L, from 1 L to 70 L, from 1 L to 60 L, from 1 L to 50 L, from 1 L to 40 L, from 1 L to 30 L, from 1 L to 20 L, or from 1 L to 10 L.

Sample Interrogation

In certain embodiments, the flow type particle analyzer includes a sample interrogation region. A primary fluid and a sample fluid may flow through and be interrogated, e.g., optically interrogated, in the sample interrogation region. In certain embodiments, the sample interrogation region includes a cuvette. The cuvette may be coupled to the output of the flow cell, e.g., the input of the cuvette may be coupled to the output of the flow cell. The cuvette may include an input and an output. The cuvette may include flow channel through which fluid flows and may be optically interrogated. The cuvette may be made from an optically transmissive material, such as silica, glass, clear plastic, or any other suitable material. In some instances, the cuvette is a gel-coupled cuvette. The gel-coupled cuvette may be a cuvette that is gel coupled to collection optics, e.g., gel coupled to a fluorescence objective lens to transmit emitted light from the interrogation point to the collection optics. At least a portion, preferably all, of the cuvette and channel are optically transparent to enable optical detection of particles within the flow stream. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

The cuvette may have any suitable dimensions. The length of the cuvette as measured between the inlet and outlet ends may vary, and in some instances ranges between 5 mm and 30 mm, 10 mm and 20 mm, 12 mm and 18 mm, 14 mm and 16 mm, and so forth. In some instances, the length of the cuvette may be 5 mm or more, 10 mm or more, 12 mm or more, 14 mm or more, 16 mm or more, 18 mm or more, 20 mm or more, 30 mm or less, 20 mm or less, 18 mm or less, 16 mm or less, 14 mm or less, 12 mm or less, or 10 mm or less. The flow channel of the cuvette may have a cross section (perpendicular to the axis of the flow channel) of any shape. In certain aspects, the flow channel may have a rectangular or square cross section. The flow channel may have a maximum cross-sectional width that varies, and in some instances is between 0.05 mm and 2 mm, 0.1 mm and 1 mm, 0.1 mm and 0.5 mm, such as 0.1 mm and 0.25 mm. In certain aspects the flow channel may have a maximum cross-sectional width of 2 mm or less, 1 mm or less, 0.5 mm or less, 0.25 mm or less, 0.13 mm or less, 0.1 mm or less, 2 mm or more, 1 mm or more, 0.5 mm or more, 0.25 mm or more, 0.13 mm or more, 0.1 mm or more, and so forth.

In certain embodiments, the flow type particle analyzer includes an interrogation source. In some cases, the interrogation source includes a light source. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances, the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, and a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO$_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The acousto-optic device may be any convenient acousto-optic device configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference in their entireties.

Light Detection System

The flow type particle analyzer may further include a light detection system. The light detection system may be configured for detecting light from a sample (e.g., light obtained from a flow stream of a flow cytometer). Any suitable light detection system may be used in the flow type particle analyzer, where in some embodiments, the system includes photomultiplier tubes, photodiodes or other light detecting devices, which are focused at an interrogation point. In certain embodiments, the light detection system includes a clustered wavelength division light detection system. The light detection system may have three or more wavelength separators that pass light having a predetermined spectral range. In some instances, the clustered wavelength division light detection system includes: three or more wavelength separators that are each configured to pass light having a predetermined spectral range; and one or more light detection modules in optical communication with each wavelength separator, wherein each light detection module includes: a plurality of photodetectors; and an optical component configured to convey light having a predetermined sub-spectral range to the photodetectors. Suitable light detection systems include those described, e.g., in U.S. patent application Ser. No. 17/159,453 filed on Jan. 27, 2021, the disclosure of which is incorporated herein by reference in its entirety.

Analyzer System

In certain embodiments, the fluid management systems of the present disclosure include a particle analyzer fluid management system that belongs to a particle analyzer configured to analyze particles in a sample fluid, e.g., optically interrogate particles in a sample fluid flowing through a cuvette to detect and analyze the particles. Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components.

Fluid flowed to the flow cell and cuvette may include a sample fluid and a primary fluid (e.g a flow of primary (e.g., sheath) fluid in conjunction with the sample to produce a laminar flow stream of primary fluid surrounding the sample flow stream). Particles in the sample fluid may be interrogated, e.g., optically interrogated, in the cuvette and scatter and/or fluorescent light may be detected. The sample fluid and primary fluid that has been flowed through the cuvette may be collected as analyzed waste fluid by an analyzer waste fluid collection subsystem fluidically coupled to the output of the cuvette. The analyzed waste fluid collected by the analyzer waste fluid collection subsystem may be transported through a waste management subsystem to a waste container by a fluid movement device. In such embodiments, the fluid management system may not include a sort block for sorting particles in the analyzed waste fluid.

Analyzer Waste Fluid Collection Subsystem

As summarized above, in some instances, the fluid management system includes an analyzer waste fluid collection subsystem configured to fluidically couple the output of the cuvette to a waste management subsystem. The analyzer waste fluid collection subsystem may be configured to receive and collect a fluid that has been flowed through the cuvette including, e.g., an analyzed fluid or one or more secondary fluids. In some instances, the fluid collected by the analyzer waste fluid collection subsystem includes analyzed fluid. Analyzed fluid may include, e.g., primary fluid and sample fluid. In some instances, the fluid collected by the analyzer waste fluid collection subsystem includes one or more secondary fluids.

The analyzer waste fluid collection subsystem may include any suitable containers and fluidic lines suitable for collecting an analyzed waste fluid. The analyzer waste fluid collection subsystem may be fluidically coupled to a waste management subsystem and waste fluid collected in the analyzer waste fluid collection subsystem may be transported through the waste management subsystem to a waste fluid container, e.g., by a fluid movement device. The analyzer waste fluid collection subsystem may include a waste accumulator fluidically coupled to the output of the cuvette and to the waste management subsystem, as described in detail below. The analyzer waste fluid collection subsystem may include a connector configured to detachably connect with the output of the cuvette, as described in detail below.

The analyzer waste fluid collection subsystem may include an analyzer waste fluid collection subsystem connector configured to detachably connect to the output of the cuvette. A user may manually connect or disconnect the analyzer waste fluid collection subsystem connector with the output of the cuvette. In some embodiments, the analyzer waste fluid collection subsystem connector provides a sterile connection with the output of the cuvette. The cuvette may include any suitable mating connector component to detachably connect with the analyzer waste fluid collection subsystem connector. The analyzer waste fluid collection subsystem connector may be any suitable fitting or connector including, e.g., a quick disconnect connector, threaded connector, luer connector, multiport connector, tri clamp fittings, and puncture and seal sterile fittings. Suitable quick disconnect connectors include, but are not limited to, snap-type (ball-latching) connectors, bayonet connectors, threaded connectors, non-latching connectors, single-shutoff connectors, double-shutoff connectors, non-shutoff connectors, dry break connectors, roller lock connectors, pin lock connectors, ring lock connectors, and cam lock connectors. In some instances, the analyzer waste fluid collection subsystem connector is connected to the output of the cuvette.

In some instances, the analyzer waste fluid collection subsystem includes a waste accumulator. The waste accumulator may be fluidically coupled, e.g., via a fluidic line, to the output of the cuvette and receive waste fluid from the output of the cuvette. The waste accumulator may be fluidically coupled, e.g., via a fluidic line, to the waste management subsystem and supply waste fluid to the waste management subsystem. The waste accumulator may be fluidically coupled to the analyzer waste fluid collection subsystem connector and the waste management subsystem. The waste accumulator may be any suitable reservoir or container for collecting and accumulating waste fluid. In some instances, the waste accumulator is a vented waste accumulator configured to collect waste fluid at atmospheric pressure. In some instances, a fluidic line coupling the waste accumulator to the waste management subsystem includes a resistor, according to any of the embodiments described herein. The resistor may provide a known fluid resistance. In some instances, waste fluid from the waste accumulator is conveyed to the waste management subsystem by a fluid movement device fluidically coupled to the waste management subsystem. In some instances, waste fluid from the waste accumulator is drawn to the waste management subsystem by a vacuum created by the fluid movement device.

Specific Embodiments

FIG. 1 provides a flow chart of the primary functions of a fluid management system configured to analyze a sample, according to certain embodiments. The primary functions are: (101) supplying a primary system fluid (e.g., sheath) and sample fluid in a controlled ratio to a flow cell; (102) supplying any number of secondary system fluids (e.g., for cleaning); (103) hydrodynamic focusing of the sample using the primary system fluid for sample interrogation through a cuvette; (104) collecting the analyzed sample as waste; and (105) managing and storing all system waste (waste from particle analyzing 104 and secondary system waste 106). The dotted lines indicate that (a) primary system fluid and sample fluid may be supplied to the flow cell or alternatively, (b) any number of secondary system fluids are supplied to the flow cell.

Figure 2:
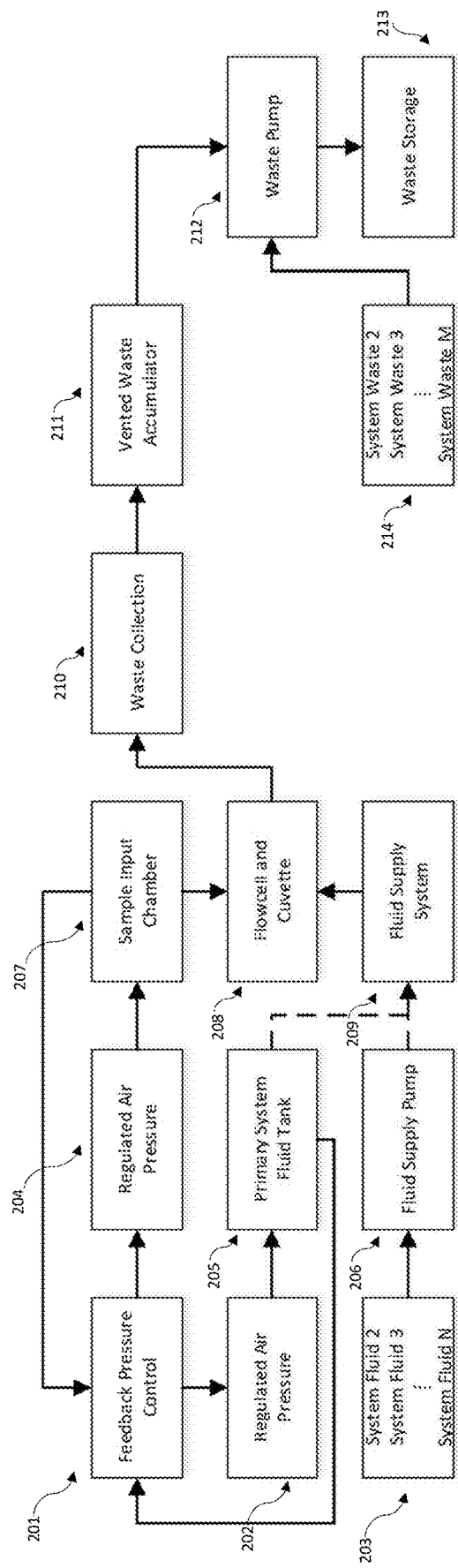
FIG. 2 provides a flow chart of sub-functions within the primary functions of a fluid management system of a particle analyzer configured to analyze a sample, according to certain embodiments.

FIG. 2 provides a flow chart of sub-functions within the primary functions of a fluid management system configured to analyze a sample, according to certain embodiments. The architecture is pump-based for the management of secondary system fluids and all waste fluids. A fluid supply pump (206) manages secondary system fluids (203). A waste pump (212) manages waste fluids from the vented waste accumulator (211) and system waste (214).

The fluid architecture has positive-pressure-based sheath and sample delivery, where a positive pressure source is used to control the ratio of sheath/sample liquid flow. The primary system fluid (sheath) is controlled via regulated air pressure (202) and sample fluid pressure is controlled via regulated air pressure (204). Feedback control (201) of the air pressure is closed-loop via inputs from the primary system fluid (sheath) chamber (205) and sample chamber (207). Examples of feedback parameters are measurement of the chamber air pressure, liquid-level height for pressure-head compensation, etc. Additionally, the primary system fluid (sheath) pressure control signal is used as feedback for the sample pressure control. The sample pressure setpoint is always sheath pressure+desired flow. This is because the sample pressure will always be greater than the primary system fluid (sheath) pressure for positive flow through the system. This allows for dynamic adjustment of the primary system fluid without changing the effective pressure drop of the sample fluid.

The pressurized primary system fluid (sheath) travels through a fluid supply system (209) and to the flow cell (208), and the pressurized sample is supplied directly to the flow cell (208). Fluids in an arbitrary number of fluid supply tanks (e.g., for cleaning fluids) (203) can also be delivered via a fluid supply pump (206) to the fluid supply system (209) in place of the primary system fluid (sheath) (205). The dotted lines indicate that (a) primary system fluid may be supplied to the flow cell (202, 205) or alternatively, (b) any number of secondary system fluids are supplied to the flow cell (203, 206). Selection of primary vs. secondary fluids is done manually, so both the primary and secondary fluids flow through the same pathway on the system. This allows for 100% swept cleaning of the fluidics system. As the primary and sample fluids travel through the flow cell and cuvette (208), the sample is interrogated.

After the primary fluid and sample fluid (or secondary fluids during cleaning) flow through the flow cell, both fluids can be considered "analyzed waste fluid" (210) which is collected in a vented waste accumulator at atmospheric pressure (211). All waste from the system (analyzed waste (210) plus any secondary waste sources such as from cleaning operations (214)) is combined and drawn by a single vacuum waste source, such as a waste pump (212). The combined waste is sent for waste storage (213).

Figure 3:
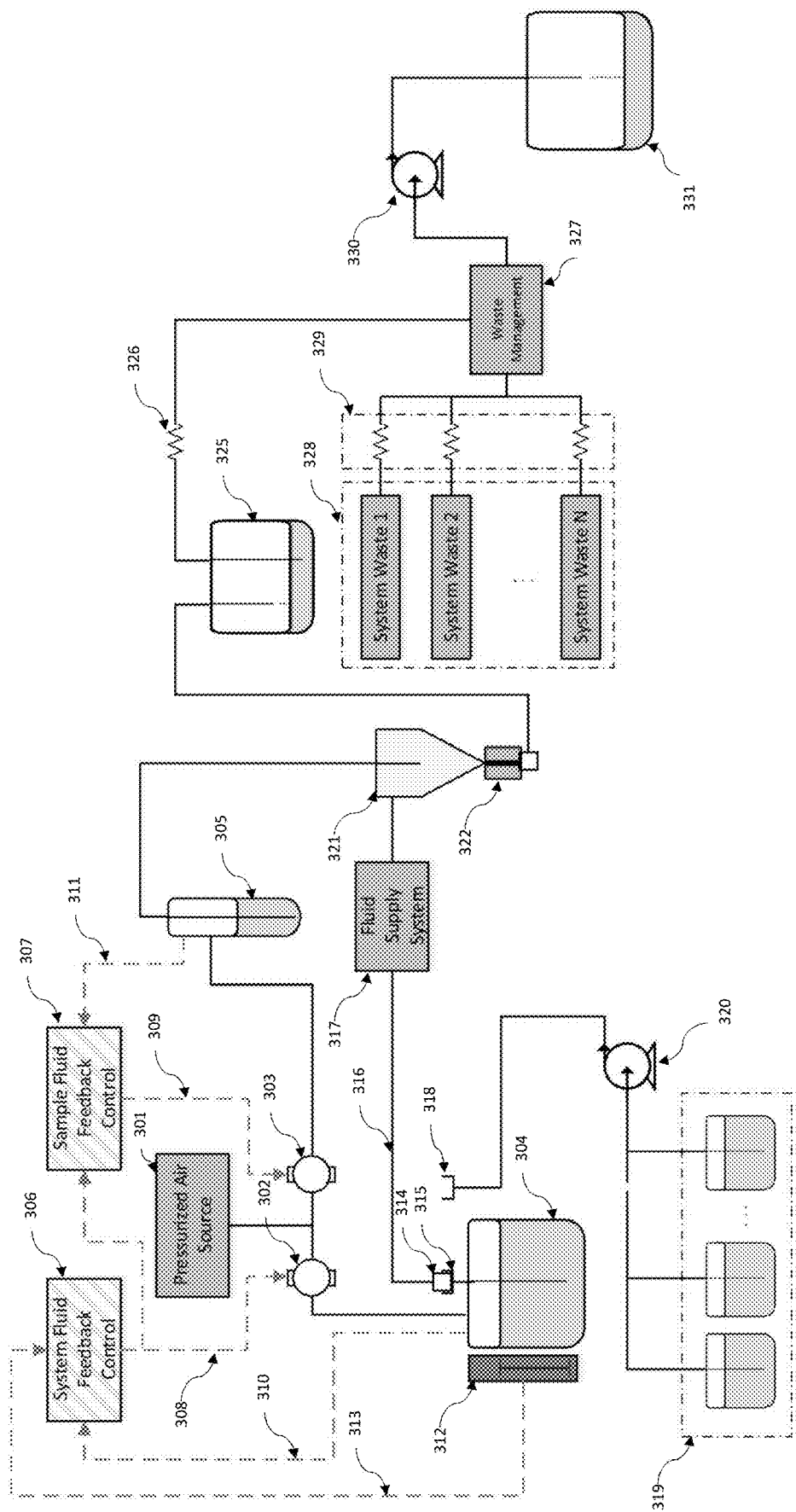
FIG. 3 provides a schematic of an embodiment of a fluid management system of a particle analyzer configured to analyze a sample.

FIG. 3 shows a schematic of an analyzer architecture of a flow cytometer, according to one embodiment. A pressurized air source (301) is used to supply air pressure to electro-pneumatic pressure regulators. The primary system fluid regulator (302) controls air pressure in the primary system fluid tank (304), and the sample fluid regulator (303) controls pressure in the sample chamber (305). A feedback control mechanism (306), such as a PID controller, is used to send a control signal (308) to the primary fluid supply regulator (302). A similar feedback control mechanism (307) is used to send a control signal (309) to the sample regulator (303). Feedback of the primary system fluid pressure comes from the measured air pressure in the primary fluid tank (310) as well as the measured liquid height in the primary fluid tank (313) using a liquid level measurement device (312). Feedback of the sample fluid pressure comes from the measured air pressure in the sample chamber (311) as well as the primary system fluid control signal (308). The setpoint of the sample fluid is always controlled as a delta above the primary system fluid pressure such that pressure drop across the sample line is constant even when primary system fluid pressure is varied. The primary system fluid tank (304) has a quick-disconnect connection (315) which connects to the fluid supply system (317) via tubing (316) and mating connector (314). The fluid supply system can be any system of fluid management which directs primary and secondary system fluids to their designated locations, such as tubing, valves, manifolds, etc. Any arbitrary amount of secondary system fluids are stored in individual tanks (319). If the secondary system fluids are needed, such as for cleaning the instrument, the fluid supply connector (314) and tubing (316) can be disconnected from the primary fluid supply tank and connected to another mating connector (318) which is connected to the fluid supply pump (320). This pump can then supply fluid to the fluid supply system (317). Primary or secondary system fluids are directed by the fluid supply system (317) to the flowcell (321). If sample is being analyzed, primary system fluid and sample fluid meet in the flowcell (321) and the sample is hydrodynamically focused into the cuvette (322), where the sample interrogation happens. After analysis, the combined primary system fluid and sample can be considered analyzer waste. This waste flows to a vented waste accumulator (325) at atmospheric pressure. This reservoir (325) is at atmospheric pressure to maintain a constant pressure drop across the flowcell and cuvette. A single waste pump (330) supplies vacuum to aspirate all sources of waste in the system. Analyzer waste in the vented waste accumulator (325) is drawn out through a tube with a known fluid resistance (326) to the waste management system (327). This resistor can be a section of tubing with known length and internal diameter, an orifice, etc. Any arbitrary number of additional sources of system waste (328), such as that used to clean other parts of the instrument, are also connected via sections of tubing with known fluid resistance (329) to the waste management system (327). The waste management system can be any system of fluid management which combined multiple sources of waste in parallel to a single output. The single waste output of the waste management system (327) is used to pull all waste sources via the waste pump (330) and all of the system waste is stored in the waste tank (331).

Methods

In certain embodiments, the methods include analyzing particles in a sample fluid with a flow type particle analyzer having a particle analyzing fluid management system as described above. In some instances, the methods include analyzing particles in a sample fluid, e.g., without subsequent sorting of the sample. In such embodiments, the methods may not include coupling a sort block to the output of the cuvette. In such embodiments, the methods may include supplying a sample fluid and primary fluid to the flow cell. The methods may include fluidically coupling a primary fluid source and a sample fluid source to the input of the flow cell. In such embodiments, the methods may include fluidically coupling a primary fluid source to a fluid supply subsystem. In such embodiments, the methods may include connecting the fluid supply subsystem connector to a primary fluid source connector fluidically coupled to a primary fluid source. The primary fluid may flow from the primary fluid source through the fluid supply subsystem to the input of the flow cell. In such embodiments, the methods may include fluidically coupling the output of the cuvette to the waste management subsystem. The methods may include fluidically coupling the analyzer waste fluid collection subsystem to the output of the cuvette. In such embodiments, the methods may include connecting an analyzer waste fluid collection subsystem connector to the output of the cuvette.

In some instances, the methods include cleaning the fluid management system. In such embodiments, the fluid management system may be configured to supply one or more secondary fluids to the flow cell. The fluid supply subsystem may fluidically couple one or more secondary fluid sources to the input of the flow cell. In some instances, the methods include fluidically coupling the fluid supply subsystem to one or more secondary fluid sources. In some instances, the methods include connecting a fluid supply subsystem connector to a secondary fluid source connector fluidically coupled to one or more secondary fluid sources. One or more secondary fluids may flow from the one or more secondary fluid sources through the fluid supply subsystem to the input of the flow cell. The one or more secondary fluid sources may include a cleaning fluid source, e.g., a container filled with cleaning fluid.

Sorter System

In certain embodiments, the fluid management systems include a particle sorter fluid management system that belongs to a particle sorter configured to analyze and sort particles in a sample fluid. Following the analysis of particles in the sample fluid, the analyzed sample fluid may be flowed from the output of the cuvette to a sort block coupled to the output of the cuvette. The flow stream may exit a nozzle in the sort block with a nozzle diameter. To produce droplets, the nozzle may be rapidly vibrated by an acoustic device, such as a piezoelectric element. To sort particles in the sample, a drop charging mechanism may charge droplets of the flow stream containing a particle type to be sorted with an electrical charge, e.g., at the break-off point of the flow stream. Droplets may be passed through an electrostatic field and deflected based on polarity and magnitude of charge on the droplet into one or more collection containers. Uncharged droplets are not deflected by the electrostatic field. Droplets, whether they are charged or are uncharged may be collected in one or more sample collection vessels or collection subsystems that are appropriately directed, e.g., positioned, to collect the one or more flow streams generated by the deflection plates.

In such embodiments, the fluid management system may be configured to analyze sample fluid in the cuvette in the same manner as done in a particle analyzer, as described in detail above, where, e.g., the system analyzes the detected light to measure physical and fluorescent properties of a particle. The flow cytometer can further sort the particles based on these measured properties. The fluid management system for a particle sorter may be identical to the fluid management system for a particle analyzer except for the particle sorter fluid management system may include a sort block, sorter waste fluid collection subsystem (instead of the analyzer waste fluid collection subsystem), and a sample collection system including one or more sample collection containers. The sort block may be configured to be coupled, e.g., detachably coupled, to the output of the cuvette. The waste fluid from sorting may be collected by the sorter waste fluid collection subsystem positioned in droplet receiving relationship to the output of the sort block. The waste fluid collected by the sorter waste fluid collection subsystem may be transported through a waste management subsystem to a waste container by a fluid movement device. The waste fluid collected by the sorter waste fluid collection subsystem may be drawn through a waste management subsystem to a waste container by a vacuum produced by the fluid movement device. Waste fluid from a sorting operation may include, e.g., particles not sorted into a sample collection container and analyzed fluids (e.g., sample fluid, primary fluid).

Sorter Waste Fluid Collection Subsystem

As summarized above, in some instances, the fluid management system includes a sorter waste fluid collection subsystem configured to fluidically couple an output of a sort block coupled to the output of the cuvette to a waste management subsystem. The sorter waste fluid collection subsystem may be configured to receive and collect waste fluid from a sorting operation performed by the flow type particle analyzer. The sorter waste fluid collection subsystem may be configured to receive and collect a waste fluid from an output of a sort block, e.g., waste fluid that has been flowed through the cuvette and exited the sort block coupled to the cuvette. The sorter waste fluid collection subsystem may be positioned in droplet receiving relationship with the sort block. The sorter waste fluid collection subsystem may include any suitable containers and fluidic lines suitable for collecting a waste fluid from sorting a sample.

In some instances, the sorter waste fluid collection subsystem includes a waste aspirator for receiving waste from an output of the sort block, the waste aspirator being fluidically coupled to the waste management subsystem. The waste aspirator may include any suitable components, e.g., tubes, containers, fluidic lines, etc., for receiving and transporting waste fluid from a sort block. The waste aspirator may convey waste received from the sort block to the waste management subsystem. In some instances, waste fluid in the waste aspirator is drawn to the waste management subsystem by vacuum created by a fluid movement device fluidically coupled to the waste management subsystem. The waste aspirator may be configured to receive waste from the output of the sort block. In some instances, the waste aspirator is positioned in droplet receiving relationship with an output of a sort block coupled to the cuvette. The waste aspirator may be fluidically coupled to the waste management subsystem with a known fluid resistance. In some instances, a fluidic line coupling the waste aspirator to the waste management subsystem includes a resistor. The resistor may provide a known fluid resistance in the fluidic line coupling the waste aspirator to the waste management subsystem. The resistor may be any resistor described herein.

Sort Block

In some instances, the fluid management system includes a sort block configured to detachably couple to the output of the cuvette (e.g., a removable sort block). By "detachably couple" is meant that the sort block may be coupled to, e.g., attached to, and then subsequently at some point be uncoupled, e.g., detached, from the cuvette. In some instances, the sort block is configured to be manually coupled to the output of the cuvette. In such embodiments, the sort block may have a connector or fitting component that allows the sort block to be coupled to the output of the cuvette. In some instances, the sort block is configured to detachably couple to the output of the cuvette in the same manner as the analyzer waste fluid subsystem connector. For example, the sort block and the analyzer waste fluid collection subsystem connector may both have identical manual connectors configured to detachably couple to the output of the cuvette.

The sort block may include any suitable components that enable sorting of particles in a sample such as, e.g., a sort nozzle and one or more deflection plates. To sort cells by an electrostatic method, the desired cell must be contained within an electrically charged droplet. To produce droplets, a sort block, e.g., sort nozzle, may be rapidly vibrated by an acoustic device, such as a piezoelectric element. The volume of a droplet may be estimated by the hydrodynamic properties of the flow stream and the nozzle dimensions. To charge the droplet, the sort block may include a charging element whose electrical potential can be rapidly changed. Because the cell stream may exit a sort nozzle in a substantially downward vertical direction, the droplets may also propagate in that direction after they are formed. Droplets, whether they are charged or are uncharged, may be collected in a sample collection vessel or by a waste fluid collection subsystem that is appropriately directed, e.g., positioned, to collect the one or more flow streams generated by deflection plates. Methods and devices for electrostatic cell sorting are described in, e.g., U.S. Pat. Nos. 9,952,076 and 9,404,846, the disclosures of which are incorporated by reference in their entireties.

The sort block may include any suitable sort nozzle configured to generate stream-in-air droplets for sorting. Combined primary fluid and sample fluid may flow from the cuvette to the sort nozzle and exit in a flow stream through an orifice of the sort nozzle. The nozzle orifice may have any diameter for example, 50 μm, 70 μm, 100 μm, or any other suitable diameter. The nozzle diameter may affect the properties of a flow stream, such as the stream dimensions, droplet break-off point and drop volume. The flow stream may be continuous flow of fluid or a series of droplets depending on the action of a droplet generator.

The sort block may include any suitable droplet deflectors configured to deflect particles in a flow stream flowing therebetween. A flow stream may be a series of droplets that are partially deflected by a pair of deflection plates and become a plurality of streams. Charged droplets may be deflected and directed by the potentials applied to the deflection plates away from their original path, e.g., toward a collection vessel. Droplets which have been neither positively nor negatively charged may not be deflected by the potentials applied to deflection plates, and therefore continue along their original path. In some instances, charged droplets are collected by the waste fluid collection subsystem. In some instances, uncharged droplets are collected by the waste fluid collection subsystem.

The sort block may deliver sorted particles to a sample collection system or a sorter waste fluid collection subsystem. The sort block may deliver a sorted sample, e.g., sorted particles of interest, to a sample collection container. The collection container may be in droplet receiving relationship with the sort block; for example, the collection container may receive a flow cytometrically sorted cellular product, e.g., in the form of droplets, from the sort block. In some cases, the sort block delivers waste fluid to a waste aspirator of the sorter waste fluid collection subsystem. The waste aspirator may be in droplet receiving relationship with the sort block; for example, the waste aspirator may receive waste fluid, e.g., in the form of droplets, from the sort block.

Sample Collection System

In some instances, the fluid management system includes a sample collection system including a sample collection container for receiving a sorted sample from an output of the sort block. The sample collection container may be any suitable container (e.g., having rigid or flexible walls) for receiving sorted particles. The sample collection system may be configured to collect sorted particles in a sterile manner. In some instances, the sample collection system includes any of the collection systems described, e.g., in U.S. Publication No. 2019/0331657, the disclosure of which is incorporated herein by reference in its entirety.

Specific Embodiments

Figure 4:
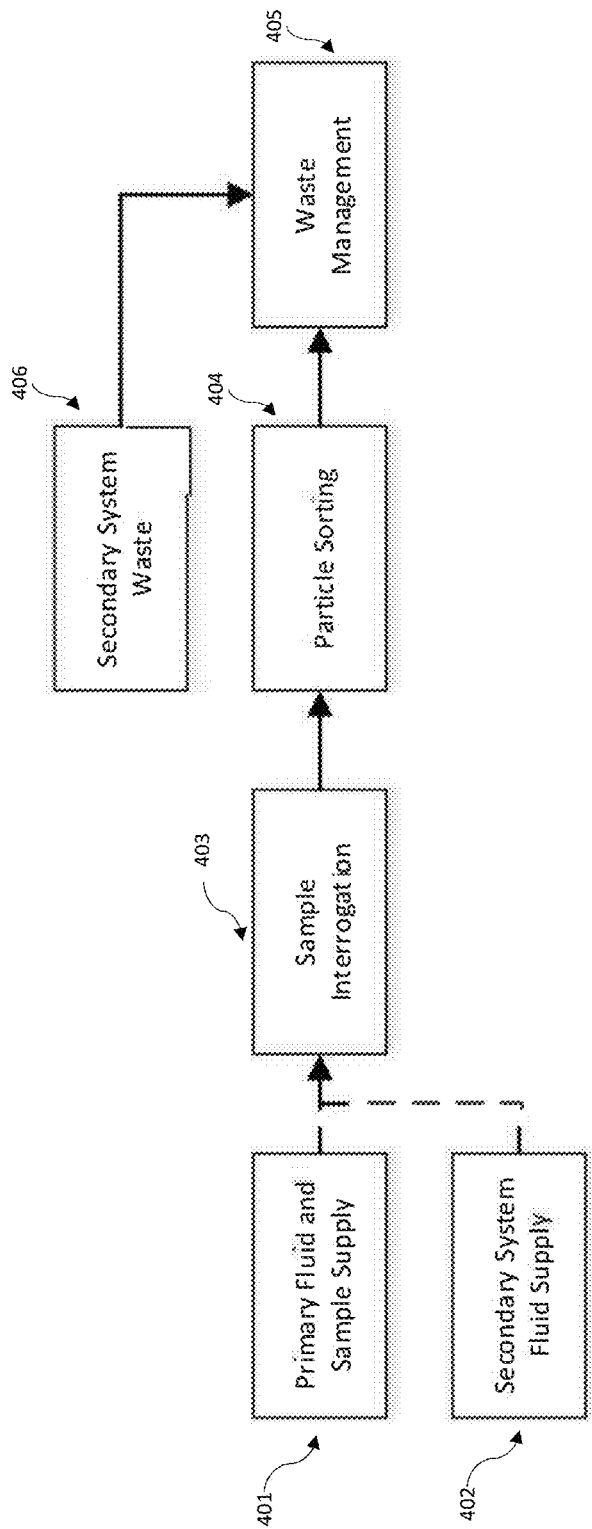
FIG. 4 provides a flow chart of the primary functions of a fluid management system of a particle sorter configured to analyze and sort a sample, according to certain embodiments.

FIG. 4 provides a flow chart of the primary functions of a fluid management system configured to analyze and sort a sample, according to certain embodiments. The primary functions are: (401) supplying a primary system fluid (e.g., sheath) and sample fluid in a controlled ratio to a flow cell; (402) supplying any number of secondary system fluids (e.g., for cleaning); (403) hydrodynamic focusing of the sample using the primary system fluid for sample interrogation through a cuvette; (404) collecting unsorted waste fluid; and (405) managing and storing all system waste (waste from particle sorting 404 and secondary system waste 406). The dotted lines indicate that (a) primary system fluid and sample fluid may be supplied to the flow cell or alternatively, (b) any number of secondary system fluids are supplied to the flow cell.

Figure 5:
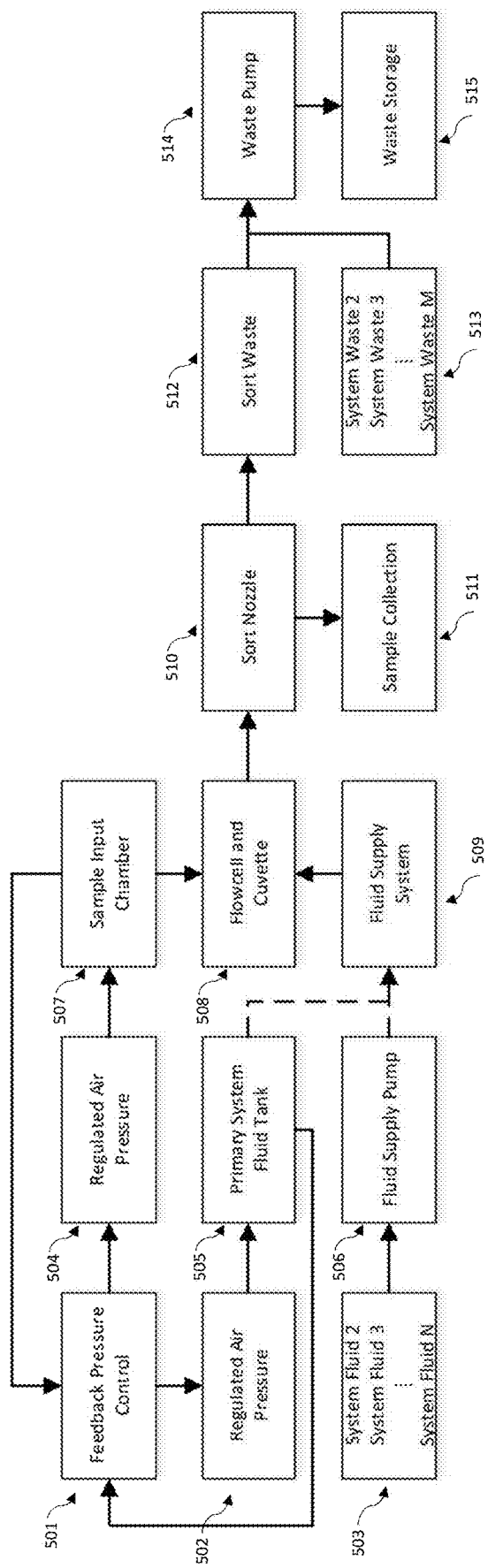
FIG. 5 provides a flow chart of sub-functions within the primary functions of a fluid management system of a particle sorter configured to analyze and sort a sample, according to certain embodiments.

FIG. 5 provides a flow chart of sub-functions within the primary functions of a fluid management system configured to analyze and sort a sample, according to certain embodiments. The architecture is pump-based for the management of secondary system fluids and all waste fluids. A fluid supply pump (506) manages secondary system fluids (503). A waste pump (514) manages all waste fluids from particle sorting (512) and system waste (513).

The fluid architecture has positive-pressure-based sheath and sample delivery, where a positive pressure source is used to control the ratio of sheath/sample liquid flow. The primary system fluid (sheath) is controlled via regulated air pressure (502) and sample fluid pressure is controlled via regulated air pressure (504). Feedback control (501) of the air pressure is closed-loop via inputs from the primary system fluid (sheath) chamber (505) and sample chamber (507). Examples of feedback parameters are measurement of the chamber air pressure, liquid-level height for pressure-head compensation, etc. Additionally, the primary system fluid (sheath) pressure control signal is used as feedback for the sample pressure control. The sample pressure setpoint is always sheath pressure+desired flow. This is because the sample pressure will always be greater than the primary system fluid (sheath) pressure for positive flow through the system. This allows for dynamic adjustment of the primary system fluid without changing the effective pressure drop of the sample fluid.

The pressurized primary system fluid (sheath) travels through a fluid supply system (509) and to the flow cell (508), and the pressurized sample is supplied directly to the flow cell (508). Fluids in an arbitrary number of fluid supply tanks (e.g., for cleaning fluids) (503) can also be delivered via a fluid supply pump (506) to the fluid supply system (509) in place of the primary system fluid (sheath) (505). The dotted lines indicate that (a) primary system fluid may be supplied to the flow cell (502, 505) or alternatively, (b) any number of secondary system fluids are supplied to the flow cell (503, 506). Selection of primary vs. secondary fluids is done manually, so both the primary and secondary fluids flow through the same pathway on the system. This allows for 100% swept cleaning of the fluidics system. As the primary and sample fluids travel through the flow cell and cuvette (508), the sample is interrogated.

After primary and sample fluid flows through the flow cell and cuvette for analysis, the fluid then travels to a sorting nozzle (510) which generates stream-in-air droplets. These droplets can be sorted for collection (511) or waste (512) via the instrument sorting mechanism. All waste from the system (sorted waste (512) plus any secondary waste sources such as from cleaning operations (513)) is combined and drawn by a single vacuum waste source, such as a waste pump (514). The combined waste is sent for waste storage (515).

Figure 6:
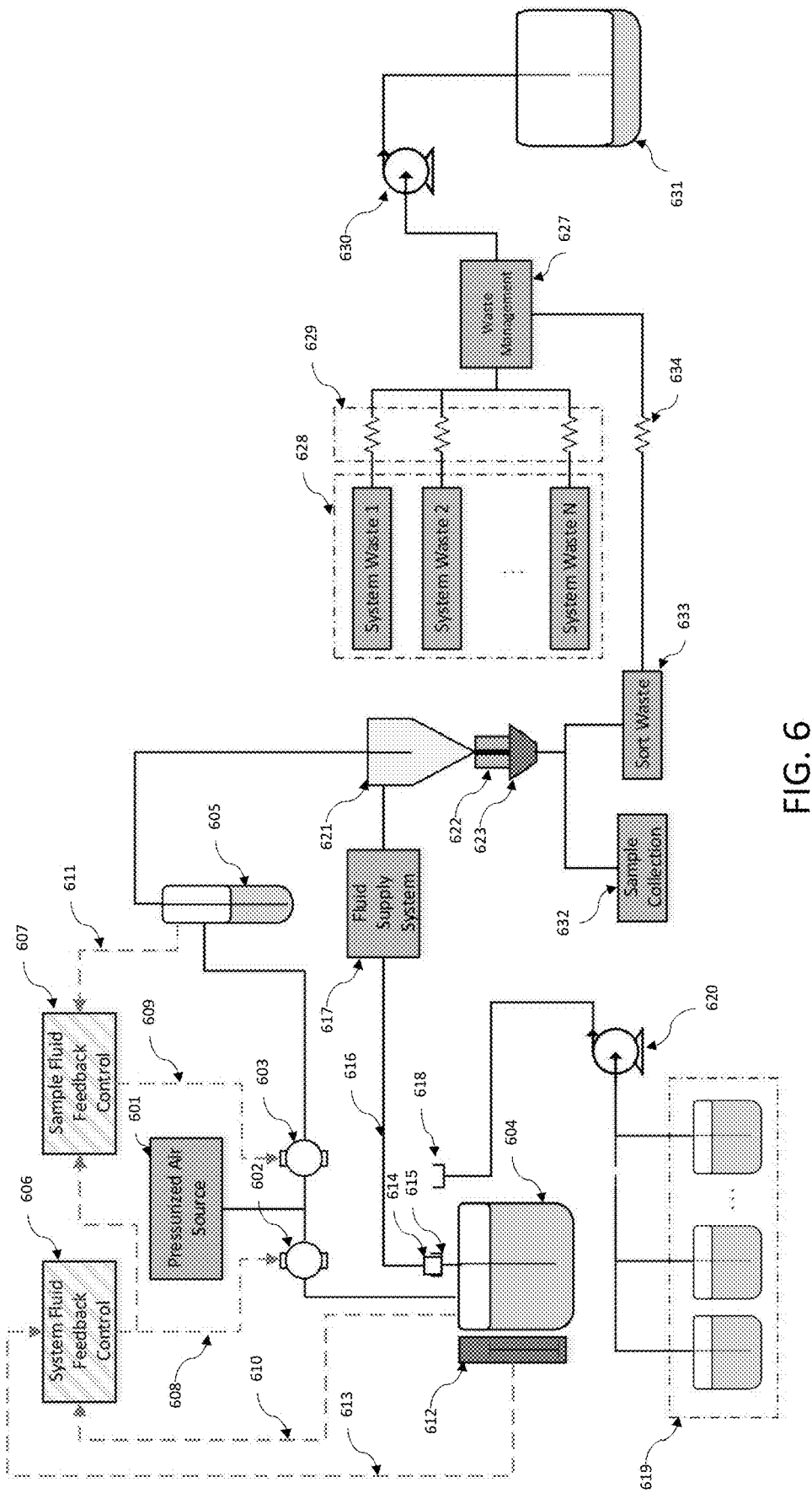
FIG. 6 provides a schematic an embodiment of a fluid management system of particle sorter configured to analyze and sort a sample.

FIG. 6 shows a schematic of a sorter architecture of a flow cytometer, according to one embodiment. A pressurized air source (601) is used to supply air pressure to electro-pneumatic pressure regulators. The primary system fluid regulator (602) controls air pressure in the primary system fluid tank (604), and the sample fluid regulator (603) controls pressure in the sample chamber (605). A feedback control mechanism (606), such as a PID controller, is used to send a control signal (608) to the primary fluid supply regulator (602). A similar feedback control mechanism (607) is used to send a control signal (609) to the sample regulator (603). Feedback of the primary system fluid pressure comes from the measured air pressure in the primary fluid tank (610) as well as the measured liquid height in the primary fluid tank (613) using a liquid level measurement device (612). Feedback of the sample fluid pressure comes from the measured air pressure in the sample chamber (611) as well as the primary system fluid control signal (608). The setpoint of the sample fluid is always controlled as a delta above the primary system fluid pressure such that pressure drop across the sample line is constant even when primary system fluid pressure is varied. The primary system fluid tank (604) has a quick-disconnect connection (615) which connects to the fluid supply system (617) via tubing (616) and mating connector (614). The fluid supply system can be any system of fluid management which directs primary and secondary system fluids to their designated locations, such as tubing, valves, manifolds, etc. Any arbitrary amount of secondary system fluids are stored in individual tanks (619). If the secondary system fluids are needed, such as for cleaning the instrument, the fluid supply connector (614) and tubing (616) can be disconnected from the primary fluid supply tank and connector to another mating connector (618) which is connected to the fluid supply pump (620). This pump can then supply fluid to the fluid supply system (617). Primary or secondary system fluids are directed by the fluid supply system (617) to the flowcell (621). If sample is being analyzed, primary system fluid and sample fluid meet in the flowcell (621) and the sample is hydrodynamically focused into the cuvette (622), where the sample interrogation happens. After analysis, the primary system fluid and sample travel through a sort nozzle (623), which creates stream-in-air droplets for sorting. Sorted sample is collected in the sample collection (632), while unsorted waste is collected in a sorted waste aspirator (633). A single waste pump (630) supplies vacuum to aspirate all sources of waste in the system. Sorted waste in the sorted waste aspirator (633) is drawn out through a tube with a known fluid resistor (634) to the waste management system (627). This resistor can be a section of tubing with known length and internal diameter, an orifice, etc. Any arbitrary number of additional sources of system waste (628), such as that used to clean other parts of the instrument, are also connected via sections of tubing with known fluid resistance (629) to the waste management system (627). The waste management system can be any system of fluid management which combined multiple sources of waste in parallel to a single output. The single waste output of the waste management system (627) is used to pull all waste sources via the waste pump (630) and all of the system waste is stored in the waste tank (631).

Methods

As discussed above, methods of using (e.g., flowing a fluid in) a flow type particle analyzer that includes a fluid management system according to any of the embodiments described herein are provided. In some instances, the methods include analyzing and sorting particles in a sample fluid with a flow type particle analyzer having particle sorting fluid management system as described above. In some embodiments, the methods may include supplying a sample fluid and primary fluid to the flow cell. The methods may include fluidically coupling a primary fluid source and a sample fluid source to the input of the flow cell. In some embodiments, the methods may include fluidically coupling a primary fluid source to a fluid supply subsystem. In such embodiments, the methods may include connecting the fluid supply subsystem connector to a primary fluid source connector fluidically coupled to a primary fluid source. The primary fluid may flow from the primary fluid source through the fluid supply subsystem to the input of the flow cell. In some instances, the methods include cleaning the fluid management system according to any of the embodiments described above, e.g., by fluidically coupling the fluid supply subsystem to one or more secondary fluid sources.

In such embodiments, the methods may include coupling a sort block to the output of the cuvette. In some instances, the sort block includes a connector that may be coupled to the output of the cuvette. In some embodiments, the methods include fluidically coupling the output of the sort block coupled to the cuvette to the waste management subsystem. In some instances, the methods include fluidically coupling a sorter waste fluid collection subsystem to an output of the sort block coupled to the output of the cuvette. The sorter waste fluid collection subsystem may fluidically couple the output of the sort block to a waste management subsystem. In some instances, the methods include positioning the sorter waste fluid collection subsystem, e.g., the waste aspirator of the subsystem, in droplet receiving relationship with the output of the sort block. In such embodiments, the fluid management system may further include a sample collection system including a sample collection container for receiving sorted components from a sample. In some instances, the methods include positioning a sample collection system in droplet receiving relationship with an output of the sort block.

Hybrid System

In certain embodiments, the fluid management systems include a hybrid system. The hybrid system may be configured to (a) analyze particles in a sample fluid (e.g., operate in analyzer mode), according to any of the embodiments described herein, or alternatively, (b) analyze and sort particles in a sample fluid (e.g. operate in sorter mode), according to any of the embodiments described herein. A hybrid system includes an analyzer waste fluid collection subsystem configured to fluidically couple the output of the cuvette to a waste management subsystem and a sorter waste fluid collection subsystem configured to fluidically couple an output of a sort block coupled to the output of the cuvette to a waste management subsystem. The fluid management system may be configured such that in some instances (a) the analyzer waste fluid collection subsystem fluidically couples the output of the cuvette to the waste management subsystem or alternatively in some instances, (b) the sorter waste fluid collection subsystem fluidically couples an output of a sort block coupled to the output of the cuvette to the waste management subsystem. The fluid management system may be configured to enable a user to select whether the analyzer waste fluid collection subsystem fluidically couples the output of the cuvette to the waste management subsystem or the sorter waste fluid collection subsystem fluidically couples an output of a sort block coupled to the output of the cuvette to the waste management subsystem. The user may base the selection on whether it desired that the flow type particle analyzer (a) analyze a sample or (b) analyze and sort a sample. For example, to enable analyzer mode, the user may manually couple an analyzer waste fluid collection subsystem connector to the output of the cuvette where the connector fluidically couples the cuvette to the analyzer waste fluid collection subsystem. In analyzer mode, a sort block may not be coupled (or may be detached from) the output of the cuvette. To enable sorter mode, the user may manually couple a sort block to the output of the cuvette and position the sorter waste fluid collection subsystem in droplet receiving relationship to an output of the sort block. In some instances, to switch from analyzer to sorter mode, the analyzer waste fluid collection subsystem, e.g., an analyzer waste fluid collection subsystem connector, is uncoupled or detached from the cuvette before a sort block is coupled to the cuvette. The hybrid fluid management system may include any of the elements of the particle analyzer fluid management systems and particle sorter fluid management systems as described above.

Specific Embodiments

Figure 7:
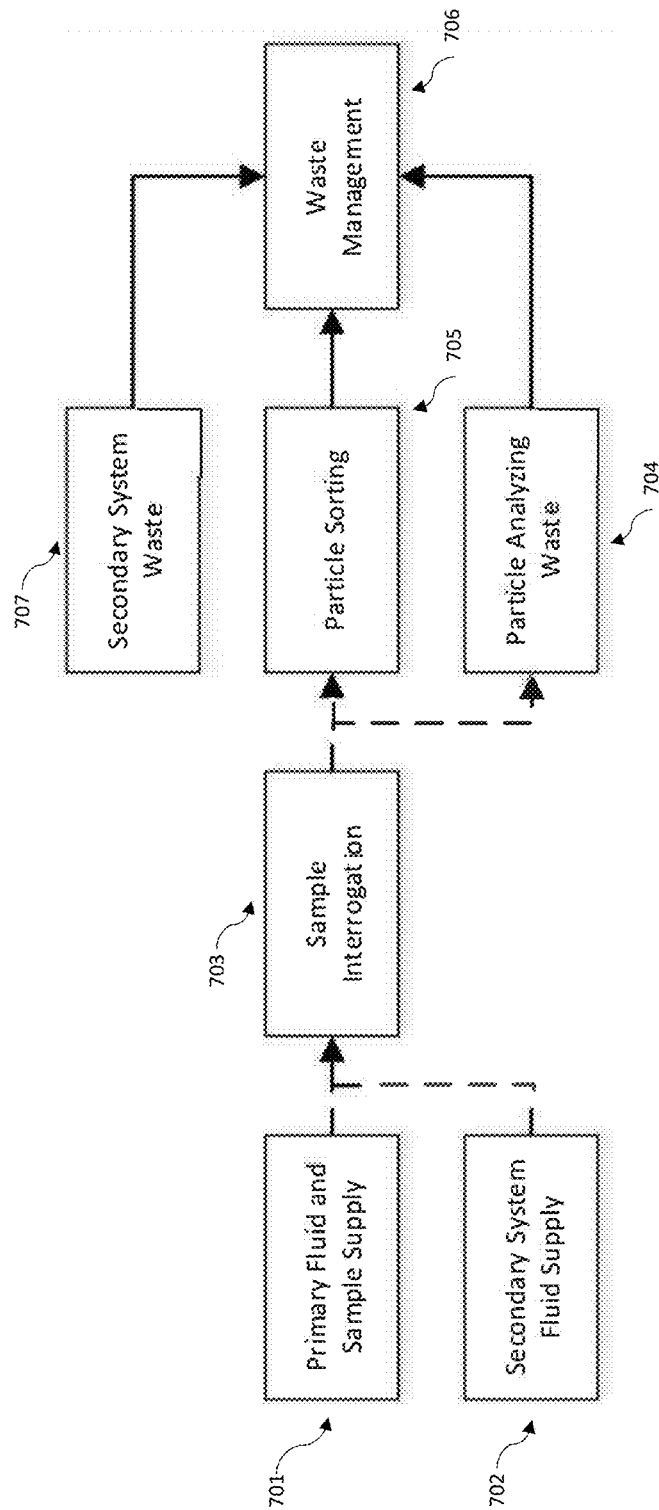
FIG. 7 provides a flow chart of the primary functions of a fluid management system of a hybrid system configured to alternatively (a) analyze a sample or (b) analyze and sort a sample, according to certain embodiments.

FIG. 7 provides a flow chart of the primary functions of a fluid management system configured to alternatively (a) analyze a sample or (b) analyze and sort a sample, according to certain embodiments. The primary functions are: (701) supplying a primary system fluid (e.g., sheath) and sample fluid in a controlled ratio to a flow cell; (702) supplying any number of secondary system fluids (e.g., for cleaning); (703) hydrodynamic focusing of the sample using the primary system fluid for sample interrogation through a cuvette; (704) collecting the analyzed sample as waste if the system is configured as an analyzer; (705) collecting unsorted waste fluid if the system is configured as a sorter; and (706) managing and storing all system waste (waste from particle analyzing (704), particle sorting (705), and system waste (707). The dotted lines before sample interrogation indicate that (a) primary system fluid and sample fluid may be supplied to the flow cell or alternatively, (b) any number of secondary system fluids are supplied to the flow cell. The dotted lines after sample interrogation indicate that (a) an analyzed sample may be sorted or alternatively, (b) waste from analyzing the sample is collected with no sorting performed.

Figure 8:
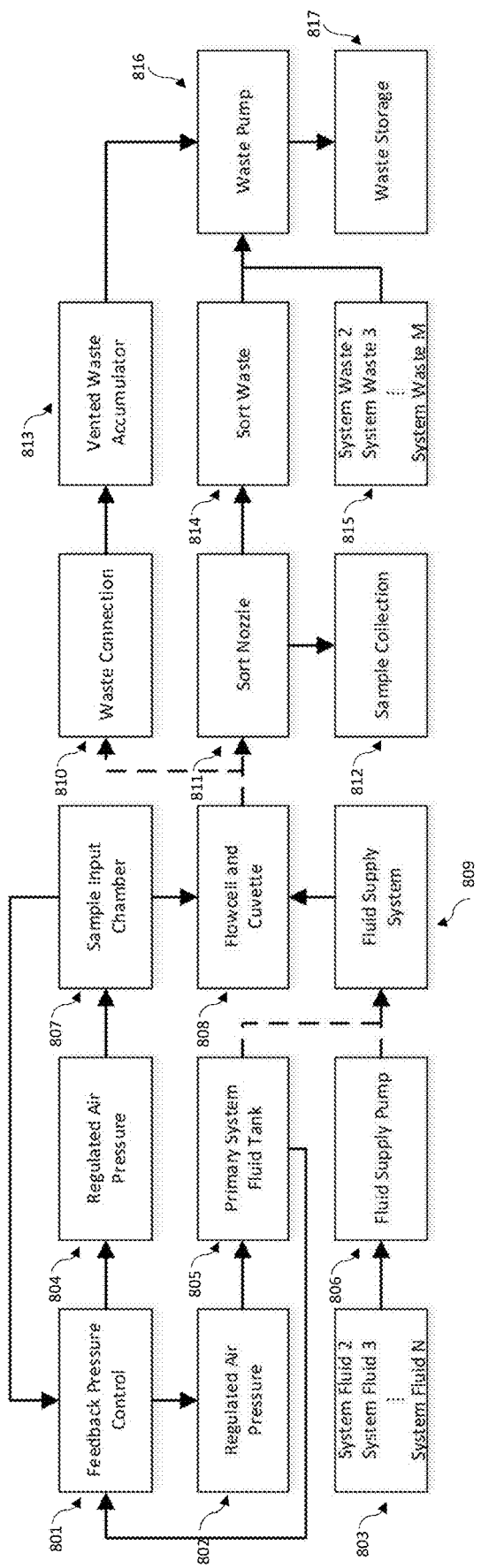
FIG. 8 provides a flow chart of sub-functions within the primary functions of a fluid management system of a hybrid system configured to alternatively (a) analyze a sample or (b) analyze and sort a sample, according to certain embodiments.

FIG. 8 provides a flow chart of sub-functions within the primary functions of a fluid management system configured to alternatively (a) analyze a sample or (b) analyze and sort a sample, according to certain embodiments. The architecture is pump-based for the management of secondary system fluids and all waste fluids. A fluid supply pump (806)

manages secondary system fluids (803). A waste pump (816) manages system waste (815) in addition to waste fluids from the vented waste accumulator (813) and particle sorting (814).

The fluid architecture has positive-pressure-based sheath and sample delivery, where a positive pressure source is used to control the ratio of sheath/sample liquid flow. The primary system fluid (sheath) is controlled via regulated air pressure (802) and sample fluid pressure is controlled via regulated air pressure (804). Feedback control (801) of the air pressure is closed-loop via inputs from the primary system fluid (sheath) chamber (805) and sample chamber (807). Examples of feedback parameters are measurement of the chamber air pressure, liquid-level height for pressure-head compensation, etc. Additionally, the primary system fluid (sheath) pressure control signal is used as feedback for the sample pressure control. The sample pressure setpoint is always sheath pressure+desired flow. This is because the sample pressure will always be greater than the primary system fluid (sheath) pressure for positive flow through the system. This allows for dynamic adjustment of the primary system fluid without changing the effective pressure drop of the sample fluid.

The pressurized primary system fluid (sheath) travels through a fluid supply system (809) and to the flow cell (808), and the pressurized sample is supplied directly to the flow cell (808). Fluids in an arbitrary number of fluid supply tanks (e.g., for cleaning fluids) (803) can also be delivered via a fluid supply pump (806) to the fluid supply system (809) in place of the primary system fluid (sheath) (805). The dotted lines leading to the fluid supply system indicate that (a) primary system fluid may be supplied to the flow cell (802, 805) or alternatively, (b) any number of secondary system fluids are supplied to the flow cell (803, 806). Selection of primary vs. secondary fluids is done manually, so both the primary and secondary fluids flow through the same pathway on the system. This allows for 100% swept cleaning of the fluidics system. As the primary and sample fluids travel through the flow cell and cuvette (808), the sample is interrogated.

The hybrid fluidics architecture contains both the vented waste accumulator (813) from the analyzer system as well as the sort nozzle (811), sample collection (812), and sort waste collection (814) from the sorter architecture. The user can select which mode of operation to perform: analyzing sample only which does not require the generation of a stream or analyzing and sorting as is in the sorter. If the system is configured as an analyzer, a waste connection (810), e.g., a connector or fitting, may be coupled to the cuvette where the waste connection fluidically couples the vented waste accumulator to the cuvette. If the system is configured as a sorter, a sort nozzle (811) may be coupled to the cuvette. The dotted lines after sample interrogation in the flow cell and cuvette indicate that (a) an analyzed sample may be sorted (811) or alternatively, (b) waste from analyzing the sample is collected with no sorting performed (810). All waste from the system (analyzed waste (813) or sorted waste (814) plus any secondary waste sources such as from cleaning operations (815)) is combined and drawn by a single vacuum waste source, such as a waste pump (816). The combined waste is sent for waste storage (817).

Figure 9:
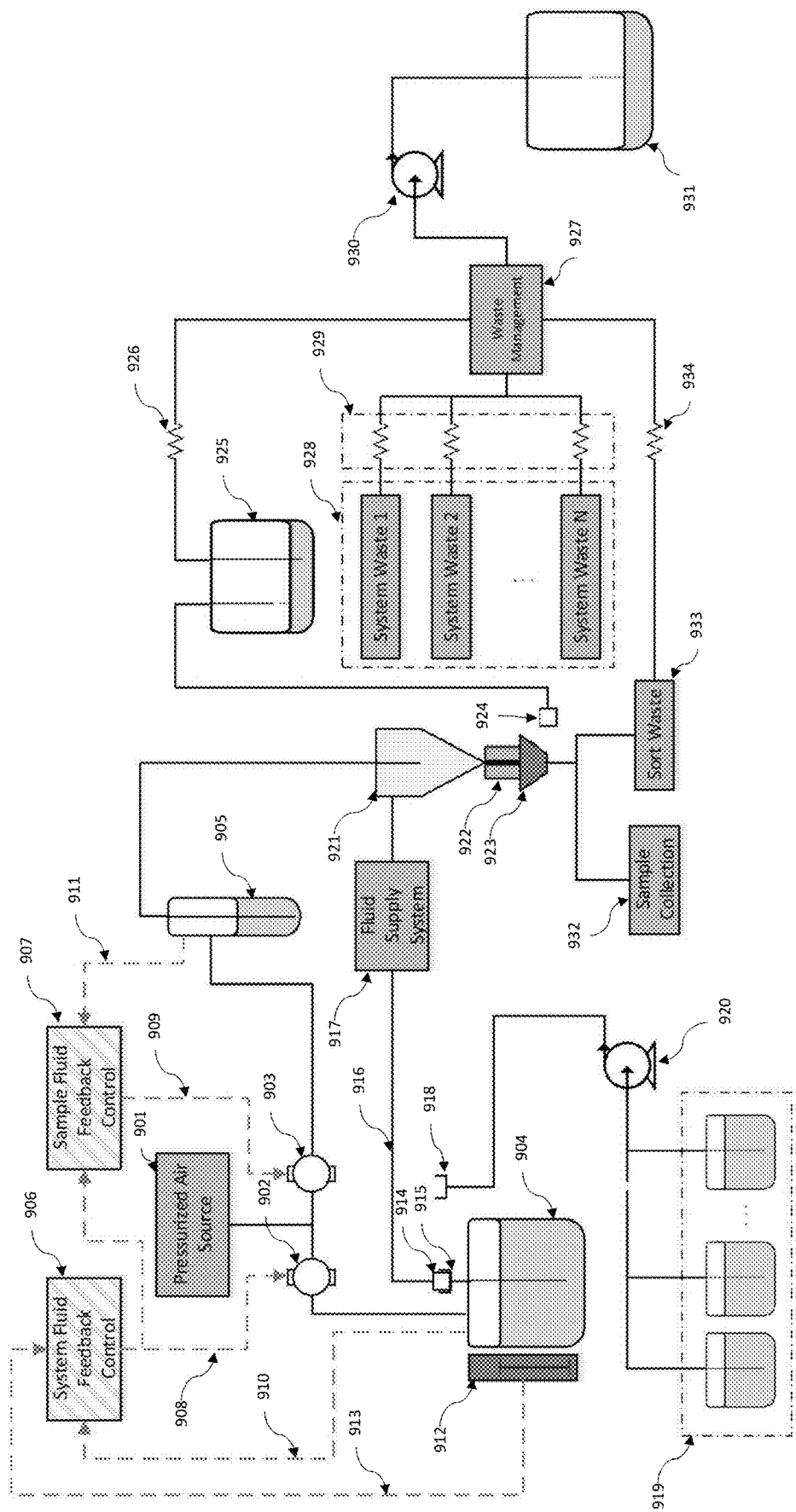
FIG. 9 provides a schematic an embodiment of a fluid management system of a hybrid system configured to alternatively (a) analyze a sample or (b) analyze and sort a sample.

FIG. 9 shows a hybrid architecture including a combination of both analyzer and sorter architectures with components to allow for switching between the functions, according to one embodiment. A pressurized air source (901) is used to supply air pressure to electro-pneumatic pressure regulators. The primary system fluid regulator (902) controls air pressure in the primary system fluid tank (904), and the sample fluid regulator (903) controls pressure in the sample chamber (905). A feedback control mechanism (906), such as a PID controller, is used to send a control signal (908) to the primary fluid supply regulator (902). A similar feedback control mechanism (907) is used to send a control signal (909) to the sample regulator (903). Feedback of the primary system fluid pressure comes from the measured air pressure in the primary fluid tank (910) as well as the measured liquid height in the primary fluid tank (913) using a liquid level measurement device (912). Feedback of the sample fluid pressure comes from the measured air pressure in the sample chamber (911) as well as the primary system fluid control signal (908). The setpoint of the sample fluid is always controlled as a delta above the primary system fluid pressure such that pressure drop across the sample line is constant even when primary system fluid pressure is varied. The primary system fluid tank (904) has a quick-disconnect connection (915) which connects to the fluid supply system (917) via tubing (916) and mating connector (914). The fluid supply system can be any system of fluid management which directs primary and secondary system fluids to their designated locations, such as tubing, valves, manifolds, etc. Any arbitrary amount of secondary system fluids are stored in individual tanks (919). If the secondary system fluids are needed, such as for cleaning the instrument, the fluid supply connector (914) and tubing (916) can be disconnected from the primary fluid supply tank and connector to another mating connector (918) which is connected to the fluid supply pump (920). This pump can then supply fluid to the fluid supply system (917). Primary or secondary system fluids are directed by the fluid supply system (917) to the flowcell (921). If sample is being analyzed, primary system fluid and sample fluid meet in the flowcell (921) and the sample is hydrodynamically focused into the cuvette (922), where the sample interrogation happens. After analysis, the primary system fluid and sample travel through a sort nozzle (923), which creates stream-in-air droplets for sorting. Sorted sample is collected in the sample collection (932), while unsorted waste is collected in a sorted waste aspirator (933). If a user wishes to run the system in an analyzer-only mode, the sort nozzle (923) is removed from cuvette, and in its place a connector (924) which leads to a vented waste accumulator (925) at atmospheric pressure is coupled to the cuvette. This reservoir (925) is at atmospheric pressure to maintain a constant pressure drop across the flowcell and cuvette. A single waste pump (930) supplies vacuum to aspirate all sources of waste in the system. Sorted waste in the sorted waste aspirator (933) is drawn out through a tube with a known fluid resistor (934) to the waste management system (927). Analyzer waste in the vented waste accumulator (925) is drawn out through a tube with a known fluid resistor (926) to the waste management system (927). These resistors can be a section of tubing with known length and internal diameter, an orifice, etc. Any arbitrary number of additional sources of system waste (928), such as that used to clean other parts of the instrument, are also connected via sections of tubing with known fluid resistance (929) to the waste management system (927). The waste management system can be any system of fluid management which combined multiple sources of waste in parallel to a single output. The single waste output of the waste management system (927) is used to pull all waste sources via the waste pump (930) and all of the system waste is stored in the waste tank (931).

Methods

As discussed above, methods of using (e.g., flowing a fluid in) a flow type particle analyzer that includes a fluid management system according to any of the embodiments described herein are provided. In certain embodiments, the methods include flowing a fluid in a hybrid fluid management system. In such embodiments, the methods may include supplying a sample fluid and primary fluid to the flow cell. The methods may include fluidically coupling a primary fluid source and a sample fluid source to the input of the flow cell. In some embodiments, the methods include fluidically coupling a primary fluid source to a fluid supply subsystem according to any of the embodiments described herein. In some instances, the methods include cleaning the fluid management system, according to any of the embodiments described above, e.g., by fluidically coupling the fluid supply subsystem to one or more secondary fluid sources.

In certain embodiments, the methods include (a) analyzing particles in a sample fluid or alternatively (b) analyzing and sorting particles in a sample fluid. In certain embodiments, the methods include analyzing particles in a sample fluid according to any of the embodiments described above. In other instances, the methods include analyzing and sorting particles in a sample fluid according to any of the embodiments described above.

Computer Controlled Systems

Aspects of the present disclosure further include computer-controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for operating a fluid management system, e.g., as described above.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, flash memory, an SD card, solid state hard drives, or other form of optical or magnetic memory devices. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, hard disc storage medium; optical storage media such as DVDs, Blu-Ray, CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a smartphone.

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, lightning ports, USB-C ports, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, tablet computer or notebook computer; or a larger device such as a desktop computer, appliance, etc. In some embodiments, the server device has a display, such as a liquid crystal display (LCD) or light emitting diode display (LED), as well as an input device, such as buttons, a keyboard, mouse or a touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, iOS, Sun Solaris, Linux, OS/400, Compaq Tru64 Unix, SGI IRIX, Siemens Reliant Unix, Ubuntu, Zorin OS and others.

Utility

The flow type particle analyzers having fluid management systems and methods of using the same of the present disclosure find use in a variety of different applications, including, e.g., research and clinical applications. The flow type particle analyzers may find use in applications where it is desirable to analyze and/or analyze and sort particle components in a sample, e.g., a biological sample. Fluid management systems of the present disclosure may be incorporated in any suitable flow type particle system, e.g., flow cytometer system. The fluid management systems may find use in any suitable flow type particle analyzer applications where a cleaning fluid is flowed through a flow type particle analyzer to clean the fluid management system. The fluid management systems may find use in applications where particular fluid pathway volumes in a fluid management system are inaccessible and it is desirable to have 100% swept cleaning of the system. The fluid management systems, e.g., having waste management control with a single fluid movement device, may find use in applications where it is desirable to decrease the cost and complexity of production and operation of flow type particle analyzers. The fluid management systems, e.g., the hybrid systems as described herein, may further find use in applications where increased flexibility in particle analysis is desired. Suitable applications include those where it is desirable to switch between (a) analyzing and (b) analyzing and sorting modes for a flow type particle analyzer. Such applications may include clinical or research applications where it is desirable, e.g., cost-effective, to have the flexibility to perform (a) particle analysis or (b) particle analysis and sorting with a single flow cytometric system in the same laboratory or clinical setting.

The fluid management systems described herein may be employed in a variety of different flow type particle analyzers, e.g., flow cytometers. Suitable flow cytometry systems in which the subject fluid managements systems may be employed include, but are not limited to, those described in U.S. Pat. Nos. 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039, the disclosure of which are herein incorporated by reference in their entirety. In certain instances, flow cytometry systems of interest include the BD Biosciences FACSCanto™ II flow cytometer, BD Accuri™ flow cytometer, BD Biosciences FACSCelesta™ flow cytometer, BD Biosciences FACSLyric™ flow cytomter, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and the like.

Additional suitable flow cytometry systems include, but are not limited to, the sorting flow cytometers described in U.S. Pat. Nos. 3,960,449; 4,347,935; 4,667,830; 4,704,891; 4,770,992; 5,030,002; 5,040,890; 5,047,321; 5,245,318; 5,317,162; 5,464,581; 5,483,469; 5,602,039; 5,620,842; 5,627,040; 5,643,796; 5,700,692; 6,372,506; 6,809,804; 6,813,017; 6,821,740; 7,129,505; 7,201,875; 7,544,326; 8,140,300; 8,233,146; 8,753,573; 8,975,595; 9,092,034; 9,095,494 and 9,097,640; the disclosures of which are herein incorporated by reference in their entirety. In some instances, the sorting flow cytometer is a Becton Dickinson cell sort, such as the BD Biosciences Influx™ cell sorter, BD Biosciences FACSAria™ III and BD FACSAria™ Fusion cell sorters, BD Biosciences FACSJazz™ cell sorter, the BD Biosciences FACSMelody™ cell sorter, and the like.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims. It is also to be understood that the terminology used herein is for the purpose of describing particular embodiments only, and is not intended to be limiting, since the scope of the present invention will be limited only by the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A flow type particle analyzer comprising a fluid management system comprising:
   a flow cell comprising an input and output;
   a cuvette comprising an input coupled to the output of the flow cell and further comprising an output;
   a sample input line for fluidically coupling a sample fluid source to the input of the flow cell such that sample fluid may flow from the sample fluid source to the flow cell; and
   a fluid supply subsystem comprising a fluid supply subsystem connector, the fluid supply subsystem configured to alternatively:
      (a) fluidically couple a primary fluid source; and
      (b) fluidically couple one or more secondary fluid sources,
   to the input of the flow cell such that fluid may flow from each fluidically coupled fluid source, through each fluid pathway of the fluid supply subsystem, to the flow cell by detachably connecting the fluid supply subsystem connector to one of a primary fluid source connector and a secondary fluid source connector at a time,
   wherein each of the primary and secondary fluid source connectors comprises a single connector for mating with a single, shared interface of the fluid supply subsystem connector, such that only one of the fluid source connectors may be connected to the fluid supply subsystem connector at a time.

2. The flow type particle analyzer of claim 1, wherein the sample input line is fluidically coupled to a sample fluid source.

3. The flow type particle analyzer of claim 1, wherein the fluid supply subsystem fluidically couples the primary fluid source to the input of the flow cell.

4. The flow type particle analyzer of claim 1, wherein the primary fluid source comprises a sheath fluid source.

5. The flow type particle analyzer of claim 1, wherein the fluid supply subsystem fluidically couples the one or more secondary fluid sources to the input of the flow cell.

6. The flow type particle analyzer of claim 1, wherein the one or more secondary fluid sources comprises a cleaning fluid source.

7. The flow type particle analyzer of claim 1, wherein the fluid management system comprises a fluid movement device configured to convey one or more secondary fluids from one or more secondary fluid sources to the fluid supply subsystem.

8. The flow type particle analyzer of claim 1, wherein the fluid management system comprises a waste management subsystem configured to receive and combine waste fluids from:
   (a) one or more system waste fluid sources; and
   (b) an analyzer waste fluid collection subsystem, a sorter waste fluid collection subsystem, or a combination thereof
   to produce a combined waste fluid.

9. The flow type particle analyzer of claim 1, wherein the fluid management system comprises:
   an analyzer waste fluid collection subsystem configured to fluidically couple the output of the cuvette to a waste management subsystem;
   a sorter waste fluid collection subsystem configured to fluidically couple an output of a sort block coupled to the output of the cuvette to a waste management subsystem; or
   a combination thereof.

10. The flow type particle analyzer of claim 1, wherein the fluid management system comprises a primary fluid pressure feedback control subsystem configured to control primary fluid pressure based on measured fluid level height and air pressure in the primary fluid source.

11. The flow type particle analyzer of claim 1, wherein the fluid management system comprises a sample fluid pressure feedback control subsystem configured to control sample fluid pressure based on measured air pressure in the sample fluid source and a primary fluid pressure control signal.

12. The flow type particle analyzer of claim 1, wherein the fluid management system comprises a pressurized air source configured to supply air pressure to a primary fluid source air pressure regulator and a sample fluid source air pressure regulator.

13. The flow type particle analyzer of claim 1, wherein the flow type particle analyzer comprises an interrogation source.

14. The flow type particle analyzer of claim 1, wherein the flow type particle analyzer comprises an acousto-optic device configured to frequency shift laser light using applied acoustic waves.

15. The flow type particle analyzer of claim 1, wherein the flow type particle analyzer comprises a controller configured to apply radiofrequency drive signals to an acousto-optic device to produce angularly deflected laser beams in an output laser beam.

16. The flow type particle analyzer of claim 1, wherein the flow type particle analyzer comprises a light detection system.

17. The flow type particle analyzer of claim 1, wherein the flow type particle analyzer is a flow cytometer.

18. The flow type particle analyzer of claim 1, wherein the primary fluid source is gaseously coupled with a pressurized air source through a primary fluid source air pressure regulator configured to control air pressure in the primary fluid source; and
   wherein the secondary fluid source connector is fluidically coupled to a fluid supply pump that is fluidically coupled to the one or more secondary fluid sources such that the pump is configured to flow the one or more secondary fluids from the one or more secondary fluid sources through the fluid supply subsystem to the flow cell.

19. A method comprising:
flowing fluid in a flow type particle analyzer comprising a fluid management system comprising:
a flow cell comprising an input and output;
a cuvette comprising an input coupled to the output of the flow cell and further comprising an output;
a sample input line fluidically coupling a sample fluid source to the input of the flow cell such that sample fluid may flow from the sample fluid source to the flow cell; and
a fluid supply subsystem comprising a fluid supply subsystem connector, the fluid supply subsystem configured to alternatively:
(a) fluidically couple a primary fluid source; and
(b) fluidically couple one or more secondary fluid sources,
to the input of the flow cell such that fluid may flow from each fluidically coupled fluid source, through each fluid pathway of the fluid supply subsystem, to the flow cell by detachably connecting the fluid supply subsystem connector to one of a primary fluid source connector and a secondary fluid source connector at a time;
wherein the input of the flow cell is fluidically coupled to either the primary fluid source or the one or more second fluid sources, and
wherein each of the primary and secondary fluid source connectors comprises a single connector for mating with a single, shared interface of the fluid supply subsystem connector, such that only one of the fluid source connectors may be connected to the fluid supply subsystem connector at a time.

20. The method of claim 19 wherein the primary fluid source is gaseously coupled with a pressurized air source through a primary fluid source air pressure regulator configured to control air pressure in the primary fluid source; and
   wherein the secondary fluid source connector is fluidically coupled to a fluid supply pump that is fluidically coupled to the one or more secondary fluid sources such that the pump is configured to flow the one or more secondary fluids from the one or more secondary fluid sources through the fluid supply subsystem to the flow cell.

* * * * *